US007069266B2

(12) United States Patent
Calderaro et al.

(10) Patent No.: US 7,069,266 B2
(45) Date of Patent: Jun. 27, 2006

(54) SYSTEM AND METHOD FOR PERSONNEL MANAGEMENT COLLABORATION

(75) Inventors: Michael Joseph Calderaro, Austin, TX (US); Robert John Castro, Raleigh, NC (US); Corrine Glavin Krumenacker, Raleigh, NC (US); Lynn P. Lepore, Round Rock, TX (US); William Daniel Ordway, Jr., Smithfield, NC (US); Patricia E. Vickers, Cedar Park, TX (US)

(73) Assignee: International Business Machines Corporation, Armonk, NY (US)

( * ) Notice: Subject to any disclaimer, the term of this patent is extended or adjusted under 35 U.S.C. 154(b) by 533 days.

(21) Appl. No.: 09/895,891

(22) Filed: Jun. 29, 2001

(65) Prior Publication Data

US 2003/0004967 A1    Jan. 2, 2003

(51) Int. Cl.
*G06F 17/30* (2006.01)
(52) U.S. Cl. .......................................... 707/9; 707/201
(58) Field of Classification Search .................. 705/11, 705/32, 40; 707/9, 201
See application file for complete search history.

(56) References Cited

U.S. PATENT DOCUMENTS

| 5,706,452 | A | 1/1998 | Ivanov ........................ 715/751 |
| 5,819,231 | A | 10/1998 | Tremaine ........................ 705/7 |
| 6,236,996 | B1 * | 5/2001 | Bapat et al. .................... 707/9 |
| 6,269,355 | B1 | 7/2001 | Grimse et al. ................. 706/46 |
| 6,275,812 | B1 | 8/2001 | Haq et al. ...................... 705/11 |
| 6,321,206 | B1 | 11/2001 | Honarvar ........................ 705/7 |
| 6,338,042 | B1 | 1/2002 | Paizis ........................... 705/11 |
| 6,347,306 | B1 * | 2/2002 | Swart ........................... 705/32 |
| 6,487,552 | B1 * | 11/2002 | Lei et al. ........................ 707/4 |
| 6,604,084 | B1 | 8/2003 | Powers et al. ................. 705/11 |
| 6,741,993 | B1 | 5/2004 | Zitaner et al. ................. 707/10 |
| 6,754,874 | B1 | 6/2004 | Richman ..................... 715/507 |
| 6,853,975 | B1 | 2/2005 | Dirksen et al. ............... 705/11 |
| 2002/0184148 | A1 * | 12/2002 | Kahn et al. .................... 705/40 |
| 2003/0154098 | A1 * | 8/2003 | Kalnas et al. .................. 705/1 |
| 2003/0182178 | A1 * | 9/2003 | D'Elena et al. ............... 705/11 |
| 2003/0216957 | A1 * | 11/2003 | Florence et al. .............. 705/11 |

OTHER PUBLICATIONS

Oracle Human Resources, North American User's Guide, Release 11, vol. 1, Mar. 1998.*

(Continued)

*Primary Examiner*—Greta Robinson
*Assistant Examiner*—Kuen S. Lu
(74) *Attorney, Agent, or Firm*—VanLeeuwen & VanLeeuwen; Herman Rodriguez

(57) ABSTRACT

A system and method for personnel management collaboration is provided. Each employee has an employee profile data area that is used to store planning data and actual data corresponding to the employee. Planning data includes risk analysis data, compensation data, and development planning data. Actual data includes current compensation data and performance data. A management team may have a common project manager with many department managers. The project manager selects employees normally included in the project manager's view, such as the department managers, and excludes them to form a new view in order to protect the confidentiality of the department manager's data. The new view can be shared amongst the department managers without compromising confidentiality. Employee data pertaining to employees reporting to the department managers is still included in the view for collaborative management meetings and online discussions. Changes to employee data are visible to all of the managers.

14 Claims, 20 Drawing Sheets

OTHER PUBLICATIONS

Oracle Human Resources, North American User's Guide, Release 11, vol. 1, Mar. 1998 (provided previously).*

Performaworks Solution (Internet Web site, 5 pages).

Visual Business Tools, "Personnel Director" (Internet Web site, 3 pages).

People Soft, "Human Resources Management" (Internet Web site, 3 pages).

"Oracle seizes the future with retention training," *Workforce*, 78, 12, 88. Dec. 1999. From DIALOG file 148, 11713011.

McNally, J. Stephen, "Retaining valued employees," *Pennsylvania CPA Journal*, vol. 71, No. 4, p. 24-28, winter 2000. From DIALOG file 15, 02096148.

*The 1999 U.S. National Employee Relationship Benchmark Report*, 2000, Walker Information Inc.

*Commitment in the workplace: the 2000 global employee relationship benchmark report*, 2001, Walker Information Inc.

Healey, Andrea, "Going beyond pay: companies lure employees with perks," Nov.-Dec. 1998, *ACA News*, vol. 41, issue 10, p. 26-29.

Lewis, Diane E., "As workers learn to be free agents, firms put new stress on retention," Oct. 31, 1999, *Boston Globe*, p. D1.

Liptow, Jennifer A., "You really like me!" Apr. 1, 2001, *Financial Planning*, p. 1.

Lazar, Gerald, "Keep your key people," May 2001, *Electronic Business*, p. 86-88, 90, 92, 94.

Ganesan et al., "The Impact of staffing policies on retail buyer job attitudes and behaviors," Spring 1996, Journal of Retailing, vol. 72, issue 1, p. 31-57.

Fey et al., "Doing business in Russia: effective human resource management practices for foreign firms in Russia," Autumn 1999, *Organizational Dynamics*, issue 69.

The 1999 U.S. National Employee Relationship Benchmark Report, 2000, Walker Informantion Inc.

Commitment in the workplace; the 2000 global employee relationship beanchmark report, 2001, Walker Informantion Inc.

Healey, Andrea, "Going beyond pay; companies lure employees with perks," Nov.-Dec. 1998, ACA News, vol. 41, issue 10, p. 26-29.

Lewis, Diane E., "As workers learn to be free agents, firms put new stress on retention, " Oct. 31, 1999, Boston Globe, p. D1.

Liptow, Jennifer A., "You really Like me !" Apr. 1, 2001, Financial Planning, p. 1.

Lazar, Gerald, "Keep your key people, " May 2001, Electronic Business, p. 86-88, 90, 92, 94.

Ganesan et al., "The impact of staffing policies on retail buyer job attitudes and behaviors," Spring 1996, Journal of Retailing, vol. 72, issue 1, pp. 31-57

Fey et al., "Doing business in Russia; effective human resource management practices for foreign firms in Russia, " Autumn 1999, Organizational Dynamics, issue 69.

P&Q Review Productivity and Quality Performance Evaluation. Version 2. Jun. 1995. (Best available copy - note that pages 12, 22, 32, and 36 are missing).

* cited by examiner

SYSTEM AND METHOD FOR PERSONNEL MANAGEMENT COLLABORATION

RELATED APPLICATIONS

This application is related to the following co-pending U.S. Patent Application filed on the same day as the present application and having the same inventor and assignee: "System and Method for Integrated Management of Personnel Planning Factors," (application Ser. No. 09/895,893); "System and Method for Improved Performance Reviews," (application Ser. No. 09/895,976); "System and Method for Organizational Risk Based On Personnel Planning Factors," (application Ser. No. 09/895,977); "System and Method for Improved Personnel Compensation Planning Factors," (application Ser. No. 09/895,886); and "System and Method for Improved Matrix Management of Personnel Planning Factors," (application Ser. No. 09/895,883); each by the same inventors and each assigned to the IBM Corporation.

BACKGROUND

1. Field of the Invention

The present invention relates to a system and method for managing human resources for an organization. More particularly, the present invention relates to a system and method for allowing management to collaborate on personnel issues while maintaining confidentiality of individuals.

2. Description of the Related Art

Managers in modern business organizations have increasingly complex roles to perform in managing the various facets of the business organization. While managers differ greatly in the objectives and goals of their respective departments or areas, a key element that most managers deal with are the employees in their department or area and their efforts to retain a highly talented pool of employees while staying within given resource requirements, such as salary and stock budgets.

Today managers and human resource leaders have limited information available for fairly reviewing employee performance, assessing the risk of individuals leaving the organization and identifying those individuals most likely to leave, fairly awarding salary increases and stock incentives based upon employee performance and the desire to retain more talented employees, and accurately comparing compensation received by the manager's employees with meaningful benchmarks.

Many managers today react to problems, such as key talent leaving the organization, rather than engaging in pre-planning activities to identify situations that eventually lead to such problems. The reason for reacting, rather than planning, for employee issues is the difficulty of organizing and tracking many disparate pieces of data about employees. Managers are often provided with different reports regarding employees' salaries, stock options, and other rewards. In separate paper or computer files the manager may keep records of employee performance reviews and the general trend of employees in terms of performance ratings. Managers are challenged, however, when comparing employees to benchmark averages or simply other employees in the same organization. Mid-level managers are often left to rely on immediate managers to fairly and accurately rate employee performances and reward the performances accordingly.

On an annual, or other periodic, basis managers review the employees performance and award salary increases, awards, and stock incentives to those individual employees deemed more critical to the organization. In large organizations, managers, especially mid-level managers, are challenged by the fact that employees are not rewarded similarly based in large part on the employees' immediate manager. While some managers are able to obtain many awards and salary increases for many members of their department, other managers struggle to obtain marginal rewards for their better employees. This dichotomy in management treatment has almost as many reasons as there are managers. Some managers may feel that their employees are handsomely paid when, in actuality, the employees' compensation is far below that of their peers. Other managers may try and keep costs in an area or department low in order to impress the manager's superiors. On the other side of the coin, managers may overly reward lower contribution to the organization in order to build a loyal team of employees or because the manager does not realize that the performance of his employees is generally less than that of other employees in the organization.

To address fairness issues, many organizations have management meetings to discuss the relative merit of employees being managed by a group of managers. These meetings often involve discussing many employees individually without clear comparisons between an employee and his or her peers. A mid-level, or project manager, often has difficulty in determining whether compensation and other awards are doled out fairly. Once again, the mid-level manager has little objective information at hand to determine whether inequities exist between employees. When a talented employee leaves the organization for a better opportunity elsewhere, it often is only discovered through discussions with the parting employee that the employee was being under compensated.

Some awards, such as stock option awards, can be used as an incentive to retain an organization's most talented employees, especially those employees whose talents are highly marketable to other organizations. The stock options granted usually vest over some number of years making it financially advantageous to the employee to remain with the organization until the options vest. While stock options are often used to retain employees, the award of options is often not coupled with a risk assessment system that identifies those employees that are highly talented and, based on talents or individual employee factors, are at a high risk of leaving the organization.

If risk assessment concerning employee retention is even performed at most organizations, it is usually based solely on the manager's intuition or feeling regarding whether an employee will leave the organization. A list of employees that might choose to leave the company might be provided to upper management for consideration. However, once again it is difficult for mid-management to understand which of the employees identified as a "flight risk" is truly a high contributor, and which are marginal or poor contributors that simply complain to management that they might seek employment at another organization.

Another challenge with traditional organizations is that human resources (HR) programs and assistance is not integrated with the particular functions, such as compensation planning, that are performed by managers. As such, these programs and guidelines are reviewed separately by managers and then applied later when the manager performs the various functions. Lack of understanding or attention to human resources programs leads to additional challenges when managers attempt to implement or use the HR programs.

What is needed, therefore, is a system and method to collect, manage, and analyze information regarding an organization's personnel in a complete and systematic way. It is desired that each level of management is integrated with the system along with human resources personnel in order to provide the various levels of management and human resources with the information needed by the particular individuals. A system and method for reviewing employee contributions is needed to adequately assess each employee's contribution in light of contributions made by his or her peers. A system and method is also needed for performing risk assessment and identifying those individuals making high contributions and with a higher risk of leaving the organization for another opportunity. A system and method is further needed to use the contribution and risk assessment data in planning employees' compensation and other awards. A system and method is needed to facilitate management meetings in order to discuss employee contributions without revealing sensitive, or confidential, information pertaining to the individual members of the management team. Finally, a system and method is needed to provide for flexibility in management structure as well as addressing unplanned organizational events or data that needs to be tracked for individual employees.

SUMMARY

It has been discovered that a system and method, referred to as the People Planner System, addresses the aforementioned challenges with the prior art. In particular, the People Planner system collects, manages, and analyzes information regarding an organization's personnel in a complete and systematic way. A data store of employee data is managed and organized to provide various levels of data to various levels of management. Executive management receive strategic level data that apply to an entire organization. They also determine enterprise level salary data that is applied to lower levels of the organization. Lower levels of management view increasingly detailed information based on the particular level of management. In addition, human resources personnel are integrated with the People Planner in order to implement HR programs and provide various levels of management with guidance regarding employment issues.

Managers use People Planner to assess, or evaluate, employee contributions to the organization. The People Planner database retains the data so that it is accessible by the manager as well as upper levels of management. The manager is therefore able to refine or re-evaluate an employee while higher levels of management are able to determine whether the manager is fairly and adequately assessing employees. People Planner provides for various functions to be performed at various times with the data collected from those functions accumulating into a more complete planning picture regarding the employee.

For example, a manager may enter evaluation data regarding the performance of employees. In addition, the manager may perform a risk analysis function for an employee using a risk analysis tool. The risk analysis tool uses actual (i.e., current) data about the employee to assist the manager in the risk assessment. The risk assessment data is stored by People Planner along with the current data. Compensation planning uses a tool that uses the actual data and the risk analysis data to assist the manager in planning the employee's compensation. Likewise, the stock planning tool uses the actual data, the risk planning data, and the compensation planning data to assist the manager in planning stock awards. The manager can also use development planning tools along with retention planning tools using the data available about the employee maintained by People Planner. Furthermore, additional programs or organizational events may be added to People Planner and the manager may select employees for the programs or events based upon considerations provided by HR or upper management.

In hybrid or matrix management organizations, an individual employee sometimes works for more than one manager. For example, an employee with a particular critical skill might be needed to work on three projects. Upper management may decide that the employee will spend 50% in the first department, 20% in the second department, and 30% in the third department. People Planner allows the three immediate managers to collaborate yet provide their own individual evaluations and compensation/stock planning data. An overall evaluation and compensation/stock award is then computed based on the inputs of the three managers.

People Planner facilitates management communication by providing managers with real-time snapshots of an organization without compromising the confidentiality of information of the managers involved in the discussions. For example, a project manager with three department managers reporting to her may want to meet with the three managers to discuss all the employees in the project manager's project. Normally the three department managers are able to view and alter the information for the employees that report to the respective managers. The project manager, however, is able to view the People Planner data for all the employees reporting to the three managers as well as salary and employment data for the three department managers. To analyze all the employees in the project collectively, the project manager can grant other employees, in this case the department managers, the ability to view the People Planner data available to the project manager. In addition, the project manager can select employee data to exclude from the project manager's view, in this case the data pertaining to the three department managers would be excluded so that the department managers do not see confidential salary and planning data that applies to their management peers. The management team can now look at the People Planner data maintained for the employees either in an online meeting with each manager viewing the same information or in a meeting room with a screen projection of the project manager's People Planner view. Changes made to employee data is seen by all managers in the team as well as analyses and information pertaining to the overall project.

When planning data if finalized and approved it is used as the basis for employees' actual data. In this way planning data becomes actual data at any time deemed appropriate, such as a date in the organization when compensation changes are instituted or when stock options are granted. Some prior planning data, such as compensation and stock options, is then cleared out in order to prepare for the next set of planning data.

The foregoing is a summary and thus contains, by necessity, simplifications, generalizations, and omissions of detail; consequently, those skilled in the art will appreciate that the summary is illustrative only and is not intended to be in any way limiting. Other aspects, inventive features, and advantages of the present invention, as defined solely by the claims, will become apparent in the non-limiting detailed description set forth below.

BRIEF DESCRIPTION OF THE DRAWINGS

The present invention may be better understood, and its numerous objects, features, and advantages made apparent to those skilled in the art by referencing the accompanying drawings. The use of the same reference symbols in different drawings indicates similar or identical items.

DETAILED DESCRIPTION

The following is intended to provide a detailed description of an example of the invention and should not be taken to be limiting of the invention itself. Rather, any number of variations may fall within the scope of the invention which is defined in the claims following the description.

Figure 1:
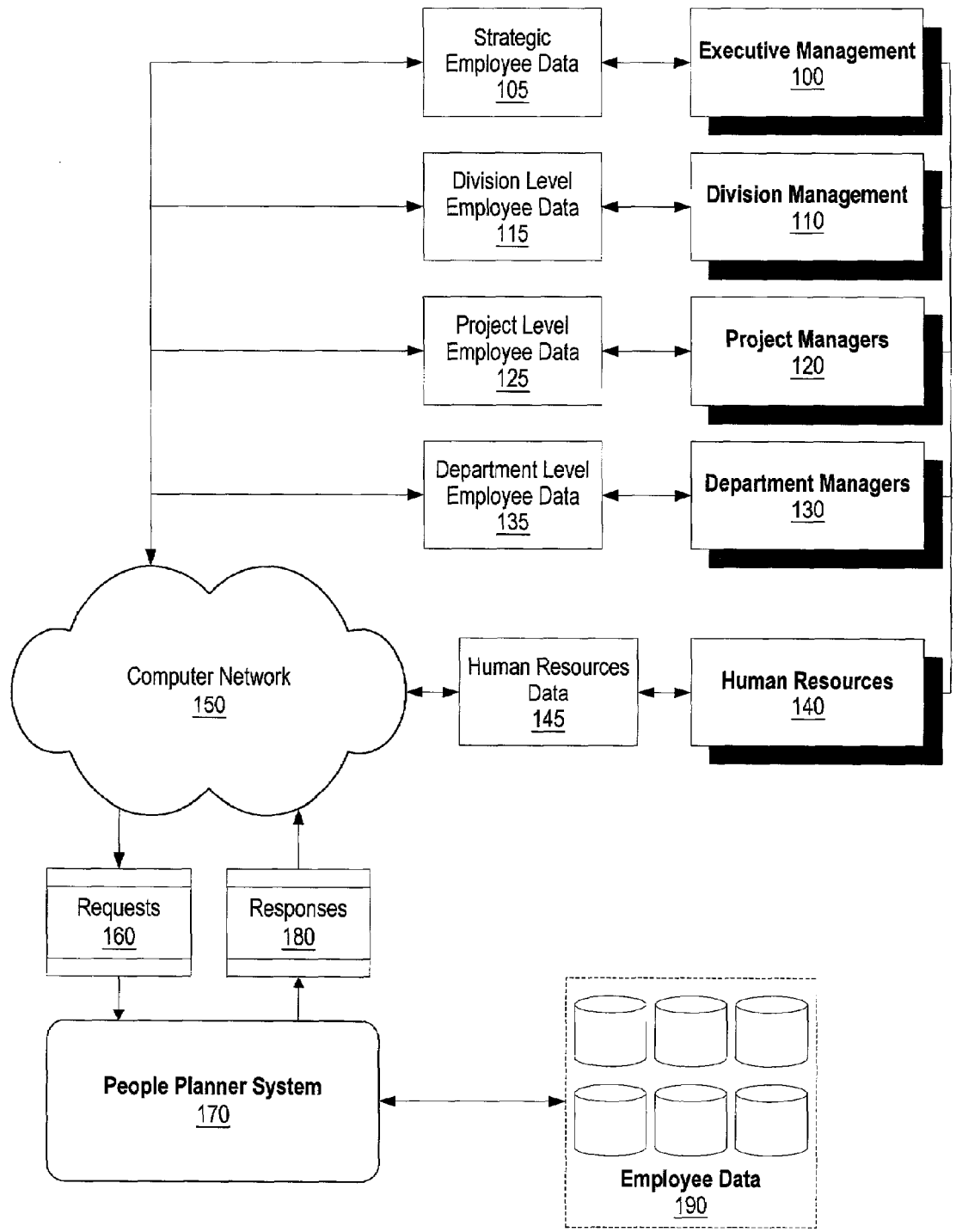
FIG. 1 is a high level diagram showing various layers of management using information managed and maintained by the People Planner System.

FIG. 1 is a high level diagram showing various layers of management using information managed and maintained by the People Planner System. Executive management 100 use People Planner System 170 to enter and view strategic employee data 105. For example, executive management 100 may use People Planner System 170 to analyze potential skill deficits or receive rollup information regarding risk assessments. This information can be used by executive management 100 to allocate additional resources to problem areas.

Division management 110 use People Planner System 170 to enter and view division level employee data 115. Division management 110 use People Planner System 170 similarly to executive management 100 except with a focus on the particular division within the organization. Again, problem areas reported by managers in employee evaluations and risk assessments can be used to provide additional resources to projects and to alert executive management to potential problems. In addition, employee analyses can be performed at high levels such as division management 110 and executive management 100 to determine whether employees with similar talents and experience levels are compensated and awarded similarly. Anomalies, such as poor performing employees receiving large salary increases and high performing employees receiving little or no salary increases can be identified, analyzed, and likely corrected.

Project managers 120 use People Planner System 170 to provide and view project level employee data 125. Project managers, like division and executive managers, can view information about any employee (including managers) reporting to the project manager. While executive management and division management may focus more on spotting anomalies and analyzing summary data to identify potential problems, project managers may often view individual employee information, especially to determine whether employees are being compensated and rewarded consistently and fairly by the department managers. Project managers 120 may also hold management meetings where People Planner System data pertaining to the department managers is excluded so that the management team can focus on the employees within the project and determine whether the employees are being treated fairly or whether poorer performing employees in one department are being evaluated as higher contributors to higher performing employees in another department. Discrepancies such as these can be resolved dynamically by the project manager or one of the department manager changing employee data. The revised employee data can thereafter be viewed and discussed. The process of refining the People Planner System data continues until the management team is satisfied with the information pertaining to all employees in the project.

Department managers 130 (i.e., immediate managers, foremen, direct supervisors) use People Planner System 170 to enter and view department level employee data 135. Department managers 130 use People Planner System 170 to evaluate employee performance, perform risk assessment, perform compensation and stock planning, complete or revise development plans for employees, perform retention plans for key employees identified as having executive potential or key technical potential, and provide additional data pertaining to employees that the manager wishes to attend HR programs or company events, such as special meetings, classes, or projects.

Human resources personnel 140 use People Planner System to assist various levels of management with personnel related questions and use People Planner System to view and enter human resources data 145. While assisting various levels of management, human resources 140 uses their skill and experience with analyzing employee data to aid management in making employee decisions and to assist managers in using People Planner System 170 to appropriately analyze the People Planner System information pertaining to the managers' employees. Human resources 140 also uses People Planner System to include new programs and events that can be used by managers with their employees. In addition, human resources 140 may determine when certain People Planner System functions take place. For example human resources 140 may determine when planning data is finalized and used as a basis for current, or actual, data to reflect employees' compensation changes, stock awards, and the like.

Computer network 150 is used to connect the various managers to People Planner System 170. Computer network 150 may be a local area network (LAN), a Wide Area Network (WAN), a mainframe computer with connected terminals, or a virtual private network (VPN) implemented over a public network such as the Internet. Computer network 150 receives People Planner requests 160 and passes the received requests to People Planner System 170. People Planner System 170 processes the request and maintains employee database 190 to store the data. In one embodiment, employee database 190 is a Lotus Notes™ database. In large organizations, employee data may be divided among several databases for performance and utilization reasons. In a distributed model, employee data for a particular area, such as a project or company location, may be located on the same database for improved maintenance of related employee records and improved lower level analyses. Higher level analyses use information summarized from the distributed databases in order to provide executive management 100 and perhaps division management 110 strategic employee data 105 and division level employee data 115. The People Planner System process request 160 and prepares and returns responses 180 which is viewed on the manager's display screen.

Figure 2:
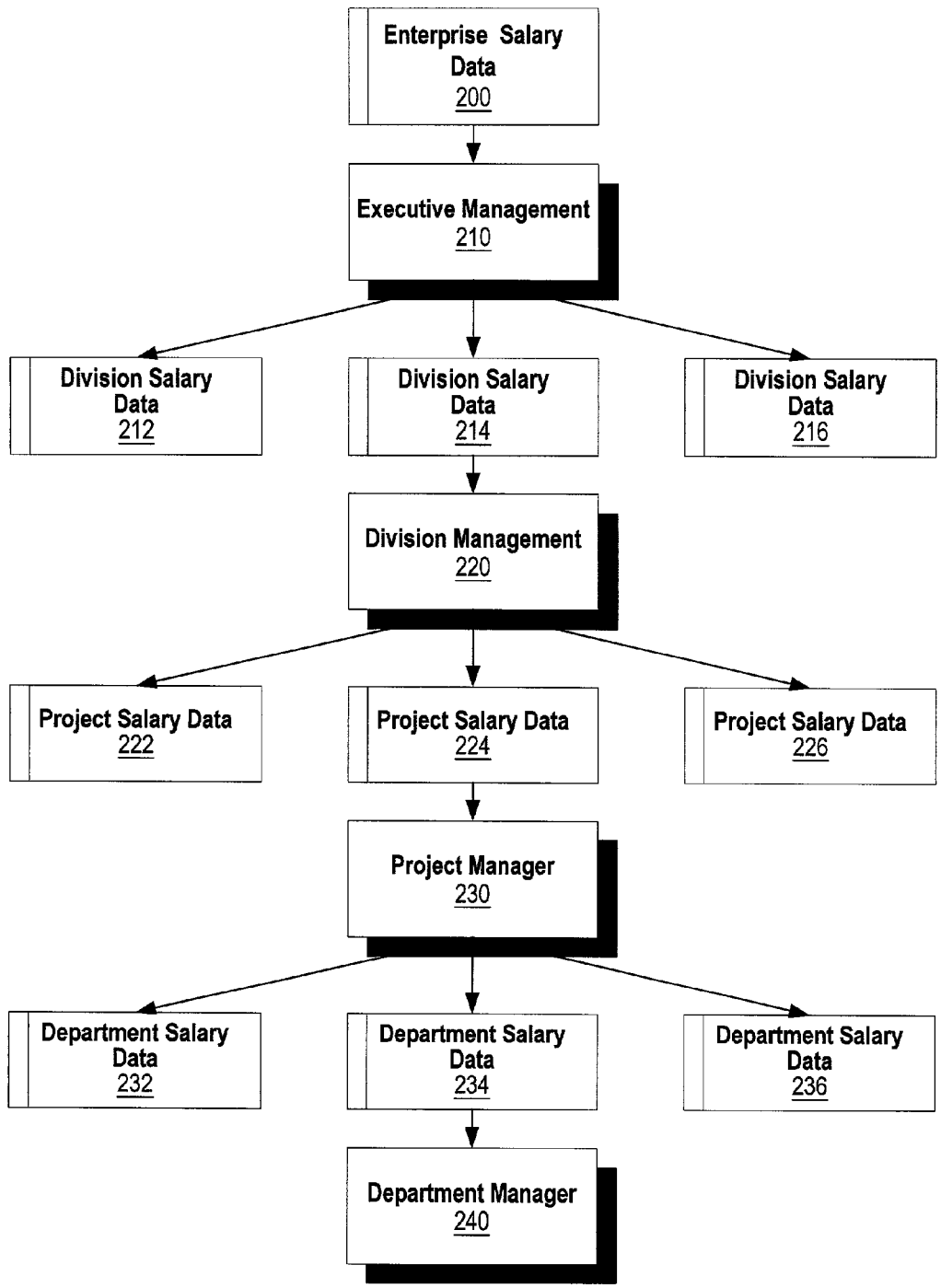
FIG. 2 is a hierarchy diagram showing resources, such as money used for salaries, being distributed and spread from high levels of the organization to lower levels of the organization.

FIG. 2 is a hierarchy diagram showing resources, such as money used for salaries, being distributed and spread from high levels of the organization to lower levels of the organization. A limited amount of compensatory resources 200 are available to distribute to employees. The amount of compensatory resources 200 depends on the size and economic health of the organization. If fewer resources are available than in previous years, executive management 210 may be forced to lower salaries or reduce the number of employees through voluntary or involuntary measures.

Executive management 210 determines how the available compensatory resources will be spread among the various high level divisions of the organization. In the example shown in FIG. 2, three division salary data are determined by executive management 210 (division salary data 212, division salary data 214, and division salary data 216). The division salary data is written to budget files available to the division managers in the People Planner System. The People Planner System is used by executive management 210 to aid in the division salary determination by providing executive management 210 with current salary needs of the various divisions, summaries of the employees and locations of the various divisions, and risk analysis information pertaining to the various divisions. The risk analysis information may alert executive management 210 to a potential situation where key types of employees, such as those with sought after technical skills, are at risk of leaving the organization. This type of information may prompt executive management to allot more to divisions at risk so that such skilled employees can be better compensated to avoid potential attrition problems. In addition, the People Planner System includes projected or planning data that aids in determining appropriate percentages of increases that should be allocated to the various divisions.

The division management, in turn, use the provided division salary data to determine how to spread the division compensatory amounts to areas, such as projects, within the division. In the example shown, division management 220 receives division salary data 214 from executive management. Division management 220 uses the People Planner System to allocate division salary data 214 to the various projects included in the division. Once again, the People Planner System is used to provide division management 220 with current salary needs of the various projects, summaries of the employees and locations of the various projects, and risk analysis information pertaining to the various projects. Division managers also use projected, or planning, data included in the People Planner System that was provided by lower levels of management. The People Planner System is used to distribute budget amounts to the various project managers. In the example shown in FIG. 2, division management 220 provides salary budgeting data to three projects. The budgeting data is provided to the projects through the People Planner System (project salary data 222, 224, and 226).

Project management uses the allocated project salary data to provide budget data to the various departments that are included in the project. The project manager's determinations are made at a more micro- rather than macro-level with individual employees' needs often used as a basis for the project manager's decisions. Again, the People Planner System is used to provide management, in this case project manager 230, with current salary needs of the employees, summaries of the employees and of the various departments, and risk analysis information pertaining to the various employees and projects. Project managers also use projected, or planning, data included in the People Planner System that was provided by immediate, or department, managers during prior planning cycles. The People Planner System is used to distribute budget amounts to the various department managers. In the example shown in FIG. 2, project manager 230 provides salary budgeting data to three departments using the People Planner System (department salary data 232, 234, and 236).

Department managers receive budget data from their project managers and use the budget data to plan compensatory changes for individual employees in the department manager's department. In the example shown, department manager 240 receives department salary budget data 234. The People Planner System is used to provide management, in this case department manager 240, with current salary needs of the employees in the department, summaries of the employees, and risk analysis information pertaining to the employees. Department manager 240 uses the People Planner System to plan compensatory changes and to record the planned changes in order for the department manager and higher levels of management to analyze the planned changes in light of the budget restraints.

The People Planner System is also used to move budget amounts between divisions, projects, and departments. For example, if a given department was initially allocated more money than deemed needed (for example, based on employee contributions and comparison of the employees' current salaries with those of employees in other departments), money that was initially allocated to the department may be reallocated by the project manager to a department that was initially under-funded. This same "give-and-take" can be applied to higher levels of the organization with the People Planner System used to identify possible areas for re-allocation and facilitate the transfer of budget amounts from one area to another.

Figure 3:
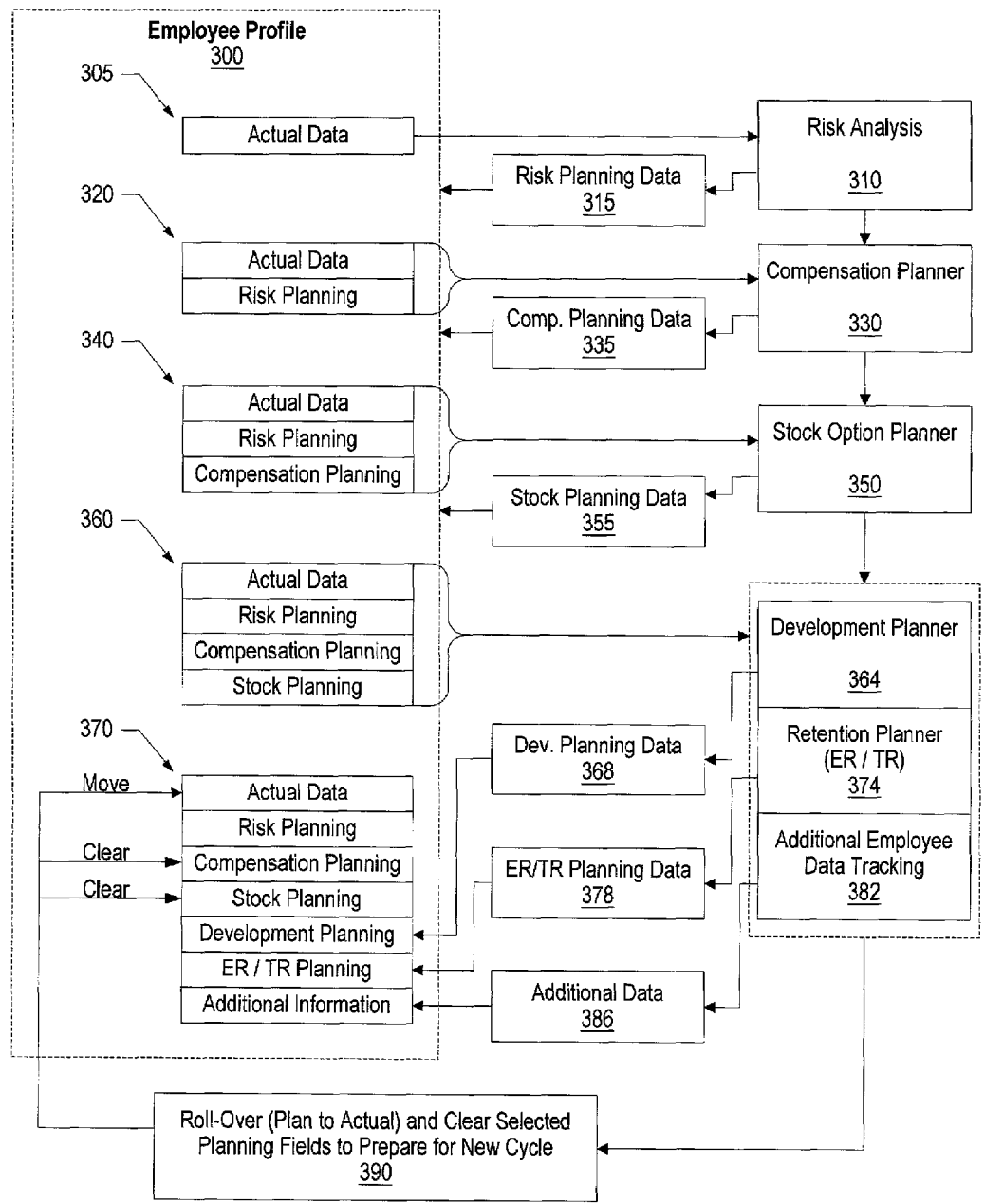
FIG. 3 is a data layer diagram showing various layer components being created to form an employee profile and how planning data is used to generate actual employment data.

FIG. 3 is a data layer diagram showing various layer components being created to form an employee profile and how planning data is used to generate actual employment data. Employee profile 300 includes actual and planning data corresponding to an employee. Actual data 305 includes information such as the employee's current salary and stock options that have been granted to the employee, the employee's current job title, level, and performance rating and any other information that the organization uses to track and assess employees. Actual data 305 may also include historical data, such as the employee's past salary levels, prior stock awards, and prior job titles, levels, and performance ratings.

The manager performs risk analysis 310 using the employee's actual data do determine the employee's value to the organization and the risk of the employee leaving the organization for other opportunities (see FIGS. 7–10 for detailed descriptions of risk analysis using the People Planner System). The manager's risk analysis is provided to the People Planner System as risk planning data 315. Employee profile 300 now has a richer set of data 320 for making further decisions regarding the employee's compensation and development.

Employee profile data 320 includes actual (or current) data as well as the risk planning data. This data is used by the manager in using the People Planner System's compensation planner 330. Based on the employee's actual data and the risk analysis data the manager is better equipped to plan changes to the employee's compensation. At this stage, compensation planning data 335 may simply identify the employee for a certain level of salary increase (i.e., significant increase, increase, cost of living increase, and no increase) it may actually plan a certain dollar-amount salary change for the employee. Compensation planning data 335 is used by the People Planner System to create an even richer set of data (340) that now includes actual data, risk planning data, and compensation planning data.

Employee profile data 340 is used by the People Planner System for the manager's stock planning 350. Actual data, risk planning data, and compensation planning data aids in the determination of whether to plan to give the employee stock options and, if so, how many options to plan on giving to the employee. Risk planning data is usually important during stock option considerations because the options typically vest over a period years providing an incentive for employees that may be at risk for leaving to stay in the organization until their options vest. In addition, the value of prior stock option awards is also useful in making the determination because prior options that are "under water" (i.e., the price of the option is now greater than the current price of the stock) have less influence on employees who are considering leaving the organization. In these situations, it may be prudent to grant additional options at the new (lower) current stock price to provide additional incentives to retain the employee. Stock planning data 355 is added to employee profile 300 creating an even richer set of employee profile data (360).

Compensatory considerations often include both compensatory planning considerations (step 330) as well as stock planning considerations (step 350). The manager may go back and forth between various stages in order to refine the data and better assess the employee's risk of leaving and the right mix of salary increases and stock option awards. For example, for a contributing employee that is at risk of leaving the organization, the manager may first decide to give the employee a significant increase in salary. However the employee's risk of leaving may be viewed as more important that the employee's current contribution. As such, the manager may decide to plan on giving the employee a sizable number of options that vest over a number of years and lower the salary increase to a standard increase, perhaps in light of salary budget constraints. The manager may go back and forth several times between compensation planning 330 and stock option planning 350 for a given employee until the manager feel she has the right mix. For additional assistance, the manager can use the People Planner System to engage the advice and experience of human resources personnel who are trained to help managers evaluate and analyze employee situations.

Employee profile 300 now includes employee data 360 which includes actual (current) employee data, risk planning data, compensation planning data, and stock planning data. Employee data 360 provides a picture for the manager to use in performing other activities such as development planning 364, retention planning 374, and identifying the employee for additional HR programs or organization events (382). Development planning 364 results in development planning data 368 which is added to the employee's profile data. Likewise, retention planning 374 results in retention planning data 378 and additional planning 382 results in additional employee data 386 which are each added to the employee's profile data. Retention planning 374 involves identifying employees with high potential early in the employee's career and establishing and tracking employee goals or milestones so that the full potential of such employees is realized by the organization (see FIG. 15 for more details regarding retention planning).

Employee profile data 370 now includes actual (current) data, risk planning data, compensation planning data, stock planning data, development planning data, retention planning data, and additional planning data providing a large snapshot of the employee, the employee's current contributions, opportunities and challenges associated with the employee, and near- and far-term plans for the employee's career with the organization.

The data captured in employee profile 300 is analyzed in management meetings and often refined in light of the employee's contribution and expected value in comparison with that of other employees. The salary and stock option planning may have only indicated that the organization planned to give the employee a "significant increase" or "significant stock option award" without specifying the actual dollar amount of the increase or the actual number of shares and vesting period for stock. In this case, the planned salary increase and stock option award are converted to actual dollar and stock figures in light of the salary and stock option budgets. The planned amounts are then made effective at a certain point in time during roll-over process 390.

During roll-over process 390 certain planning items, such as compensation and stock planning figures are moved to the employee's actual (current) data. Other items such as the employee's evaluation rating are also moved from planning areas to the actual data area. Prior actual figures are moved to historical actual data areas in order to keep a record of the employee's prior salaries, stock options, and evaluations. Short term planning data areas, such as the salary planning area and the stock planning area are cleared in order to prepare for the next planning cycle. The new actual data is used in a production environment to generate paychecks with the employee's new salary level and to generate stock option data that is provided to employees for acceptance of the newly granted options and eventual exercise of such options. Long term planning data, such as risk analysis data, development planning data, and retention planning data are retained for further refinement in future planning cycles so that the planning efforts of the manager are not lost or forgotten. In addition, when an employee moves from one department to another department (or when a new manager is assigned to a department) the new manager uses the People Planner System to view the planning and actual data established by the manager's predecessor, thus aiding and smoothing the transition from one manager to the next.

Figure 4:
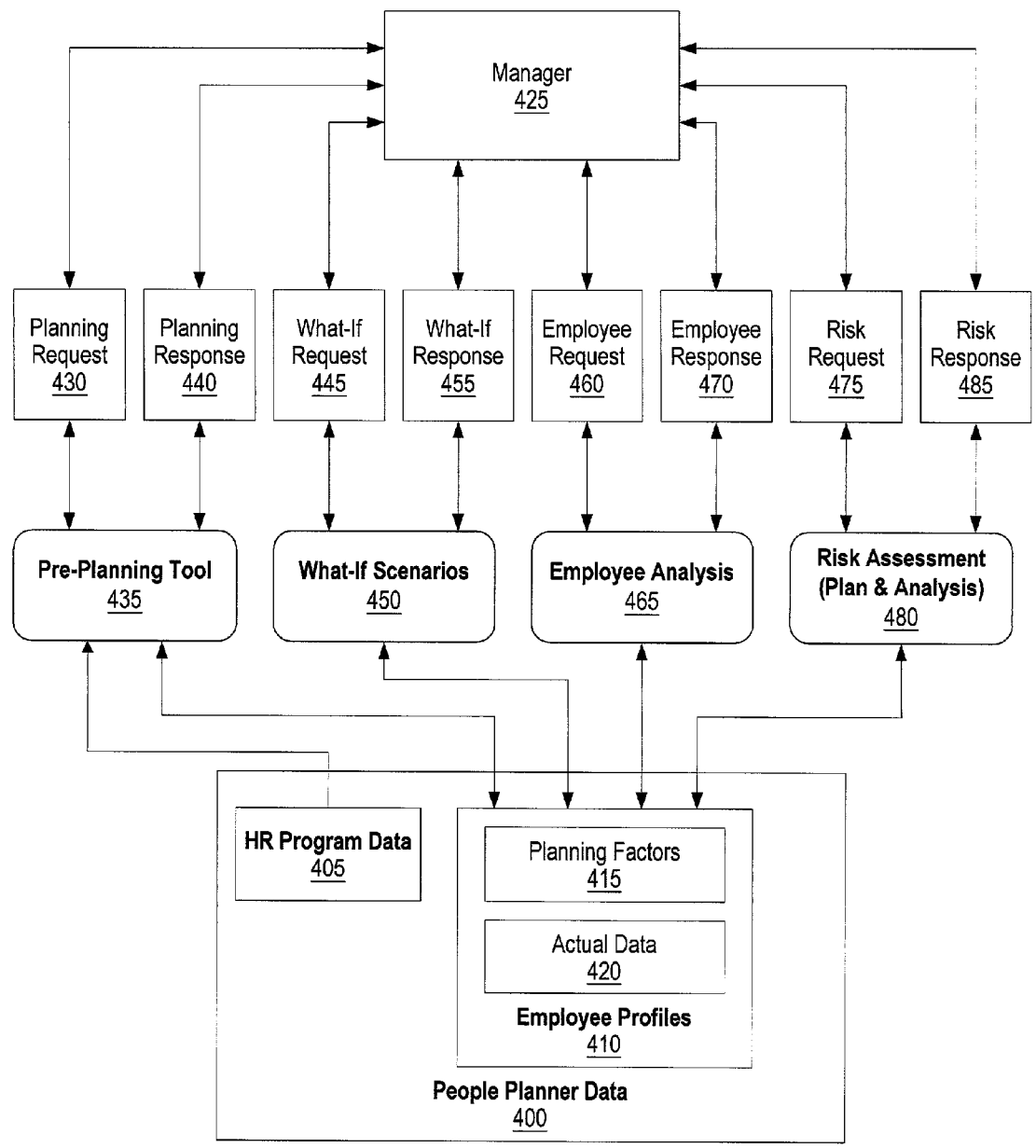
FIG. 4 is a diagram showing a manager using the People Planner System to perform planning and analysis functions.

FIG. 4 is a diagram showing a manager using the People Planner System to perform certain planning and analysis functions. People Planner Data 400 includes employee profiles 410 and Human Resources program data 405 as well as other data. Employee profile data 410 includes planning factors 415 (such as risk planning data, salary and stock planning data, development planning data, etc.) corresponding to employees. Employee profile data 410 also includes actual data 420 (such as the current salary, stock option grants, evaluation rating, etc.) corresponding to employees.

Manager 425 uses various components of the People Planner System to make pre-planning requests 430 to pre-planning tool 435 included with the People Planner System. Pre-planning tool 435 reads HR program data 405 and employee profile data 410 alerting the manager of new human resources programs and identifying employees that, based on the HR program criteria, might be considered for various programs. Manager 425 may select one or more employees for the HR program and provide planning response 440 which is used by pre-planning tool 435 to retain the manager's selections in selected employee profiles 410.

What-If Scenarios tool 450 is used by manager 425 to try various planning factors and explore the overall planning results without committing to the planning factors. For example, manager 425 may provide what-if request 445 to look at the department if everyone that is identified as being a high risk to leave the company was given a significant salary increase and an award of stock options. What-if results 455 would be returned to manager 425 by the what-if scenario tool and display the effect on the department. The manager may determine that too much of the salary budget would be used for these individuals and not leave enough for high contributing employees that are not at risk of leaving. Scenario tool 450 can be used repeatedly to help the manager gain an understanding of the effects of certain planning decisions. If manager 425 is satisfied with the scenario results, the planning factors used to create the results can be applied to employee profiles 410. In addition, HR personnel can share the manager's online view of such scenario results and provide guidance for refining the planning factors. If the what-if results are not acceptable by manager 425 then the planning factors used by the what-if tool can be discarded and not applied to employee profiles 410.

Employee analysis tool 465 is used by manager 425 to further analyze an individual employee or a group of employees included in employee profiles 410. Manager 425 provides employee requests 460 to the employee analysis component of the People Planner System. Manager 425 uses employee analysis tool 465 to evaluate the contributions of the employee and determine whether the employee is a low or high contributor and whether a promotion should be planned for the employee. These determinations are provided in the manager's employee responses 470 that are used by employee analysis component 465 and retained in employee profile 410. The manager's employee responses 470 may identify employees as low or high contributors and may also assign an evaluation rating (i.e., "A," "B," "C," etc.) to the employee (see FIG. 6 for further detail regarding employee evaluations using the People Planner System).

Risk assessment component 480 of the People Planner System is used by manager 425 to identify employees that are at risk of leaving the organization. Manager 425 provides risk requests 475 to risk assessment component 480 identifying one or more employees from employee profile 410. Risk assessment tool 480 assists the manager in evaluating risks concerning employees. Manager's risk responses regarding such employees is used by the risk assessment tool to update the employee's risk planning data maintained in the employee's employee profile 410.

Figure 5:
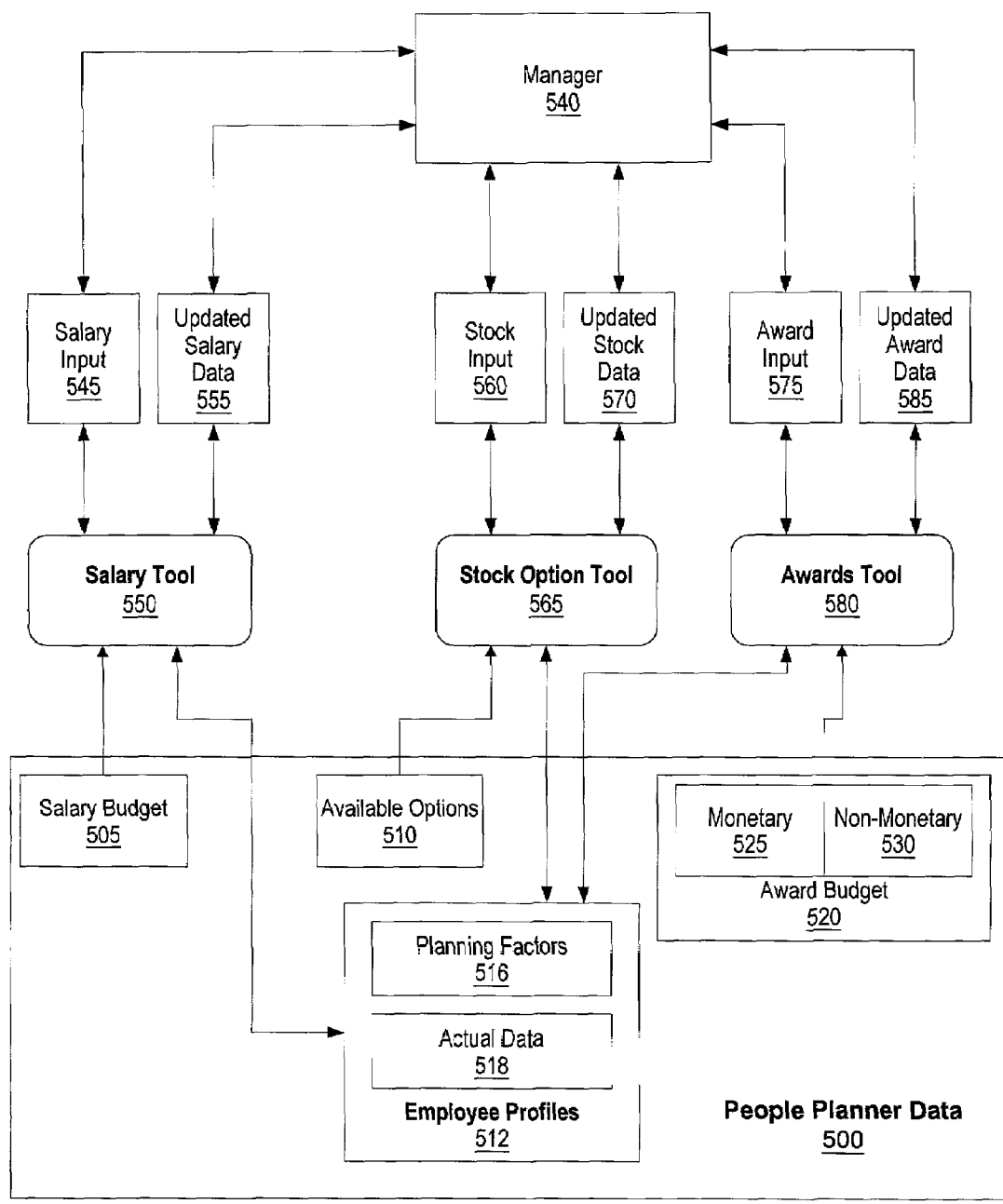
FIG. 5 is a diagram showing a manager using the People Planner System to perform compensation functions.

FIG. 5 includes additional People Planner System tools used by managers to plan for employee salary changes, stock options, and other awards. People Planner Data 500 includes salary budget data 505, available option data 510, employee profiles 512 and award budget data 520. Salary budget data 505 includes available salary data that has been allocated to the manager's area or department. Likewise, available option data 510 includes stock options available for the manager to grant to one or more employees. Employee profile data 512 includes planning factors data 516 and actual, or current, data 518. Award budget data 520 includes budgets for both monetary awards 525 and non-monetary awards 530. Non-monetary awards may include extra vacation days, admission to a special organizational event or program, lunch with an executive or the like.

Manager 540 uses salary tool component 550 of the People Planner System to plan salary changes for employees. Salary input 545 includes the salary changes requested by the manager. Salary tool 550 updates the appropriate employee profile planning factors 516 data for the selected employee. Salary tool 550 also provides manager 540 with updated salary planning data 555 comparing the manager's planning data for one or more employees with salary budget 505. Salary tool 550 can also be used to compare employee's actual data 518 and planning factors 516 with organizational, regional, or national averages for people with similar skills and contribution levels. Salary tool 550 can also be used to analyze whether people are being compensated fairly. For example, salary tool 550 can aid the manager in identifying high contributors that are receiving small or no salary increases. On the other side, salary tool 550 can be used to identify low contributing employees that are planned to receive large or significant salary increases.

Stock option tool 565 is a People Planner System component to aid manager 540 in identifying employees that should receive stock options. Stock option tool 565 reads the available stock option budget data 510 which includes the amount of options that are available for the manager's employees. Stock option tool 565 also reads employee profile data 512, particularly planning factors data 516 which includes risk planning data and contribution data corresponding to the employees. This information is used by manager 540 to determine whether the employee is a high contributor to the organization with critical skills and the flight risk the employee presents to the organization. Based on this analysis, manager 540 decides whether to plan to award the employee stock options and, if so, how many options to provide and the vesting period for the options (stock input 560). Updated stock data 570 is provided from stock option tool 565 to manager 540 in response to stock option input 560 provided by the manager. The manager can use the updated stock data to determine whether the stock planning data should be changed.

Awards tool 580 is a People Planner System component to aid manager 540 in identifying employees that should receive monetary and non-monetary awards. Awards tool 580 reads the available awards budget data 520 which includes the amount of monetary and non-monetary awards options that are available for the manager's employees. Awards tool 580 also reads employee profile data 512, particularly contribution data corresponding to the employees. This information is used by manager 540 to identify employees that are planned to receive an award, the type of award the employee is planned to receive, and the amount of the award if the award is monetary (award input 575). This data is stored in the appropriate employee profiles 512. Updated award data 585 is provided from awards tool 580 to manager 540 in response to award input data 575 provided by the manager. The manager can use the updated award data to determine whether the award planning data should be changed.

Figure 6:
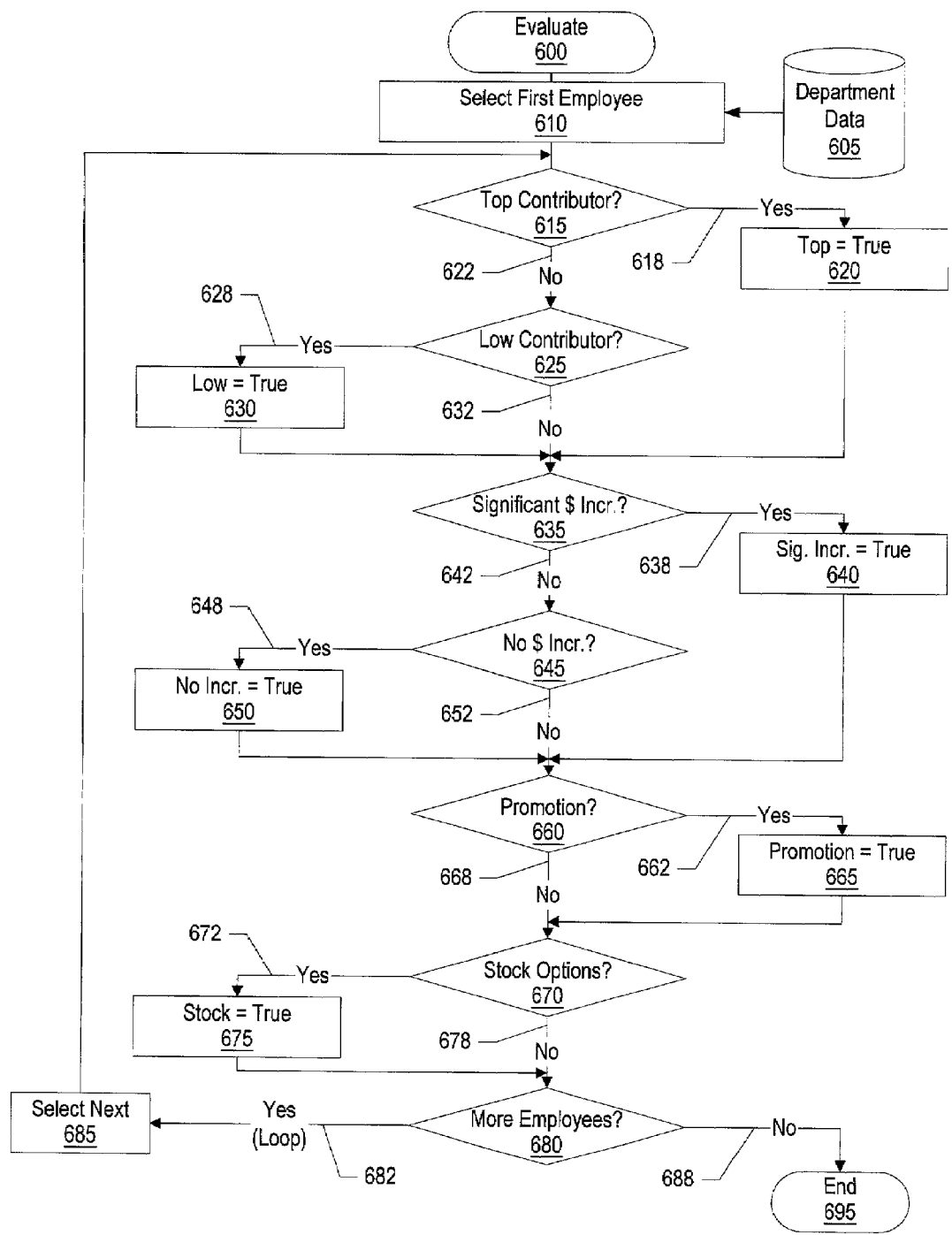
FIG. 6 is a flowchart showing the People Planner System being used to evaluate the performance of employees.

FIG. 6 is a flowchart showing the People Planner System being used to evaluate the performance of employees. Processing commences at 600 whereupon the first employee is selected (step 610) from department data 605 stored in the People Planner System. The manager analyzes the employee on a variety of planning factors. A determination is made as to whether the employee is a top contributor for the organization (decision 615). If the employee is a top contributor, decision 615 branches to "yes" branch 618 whereupon a flag is set in the employee's People Planner Data indicating that the employee is a top contributor (step 620). On the other hand, if the employee is not a top contributor, decision 615 branches to "no" branch 622 whereupon another determination is made as to whether the employee is a low contributor (decision 625). If the employee is a low contributor, decision 625 branches to "yes" branch 628 whereupon a flag is set in the employee's People Planner Data indicating that the employee is a low contributor (step 630). If neither flag is set (i.e. the low or high contributor flags) then the employee is deemed an average contributor to the organization.

The next decisions deals with the amount of pay increase to plan on giving the employee. A determination is made as to whether the employee should receive a significant, or high, increase in salary (decision 635). If the employee should receive a significant salary increase, decision 635 branches to "yes" branch 638 whereupon a flag is set in the employee's People Planner Data indicating that the employee should receive a significant salary increase (step 640). On the other hand, if the employee should not receive a significant salary increase, decision 635 branches to "no" branch 642 whereupon another determination is made as to whether the employee should receive no increase, or perhaps a salary reduction (decision 645). If the employee should receive no increase, or perhaps a salary reduction, decision 645 branches to "yes" branch 648 whereupon a flag is set in the employee's People Planner Data indicating that the employee should receive no increase, or perhaps a salary reduction (step 650). If neither flag is set (i.e. the significant increase or no increase flags) then the employee is planned to receive a normal salary increase.

A determination is made, based factors such as the employee's contribution to the organization, current level, and time spent at the current level, as to whether the employee should be promoted during the next cycle of promotions (decision 660). A higher level position often means greater potential salary and stock option awards. If the manager determines that the employee should be promoted based on various factors, decision 660 branches to "yes" branch 662 whereupon a flag is set in the employee's People Planner Data indicating that the employee should be promoted (step 685). On the other hand, if the manager does not decide that the employee should be promoted, decision 660 branches to "no" branch 668 bypassing the promotion setting step.

A determination is made, based factors such as the employee's skills, experience, contribution, and risk of the employee leaving the organization, as to whether the employee should receive stock options (decision 670). An employee with critical skills which are marketable to other competing organizations often receive stock options to provide an incentive for such employees to remain with the organization for the amount of time it takes for the options to vest. If the manager determines that the employee should receive stock options, decision 660 branches to "yes" branch 662 whereupon a flag is set in the employee's People Planner Data indicating that the employee should receive stock options (step 675). On the other hand, if the manager does not decide that the employee should receive stock options, decision 670 branches to "no" branch 678 bypassing the stock option setting step.

A determination is made as to whether there are more employees that the manager needs to evaluate (decision 680). If there are more employees, decision 680 branches to "yes" branch 685 which selects the next employee (step 685) from department data 605 and loops back to evaluate the employee. This looping continues until all employees have been evaluated, at which time decision 680 branches to "no" branch 688 whereupon processing ends at 695.

Figure 7:
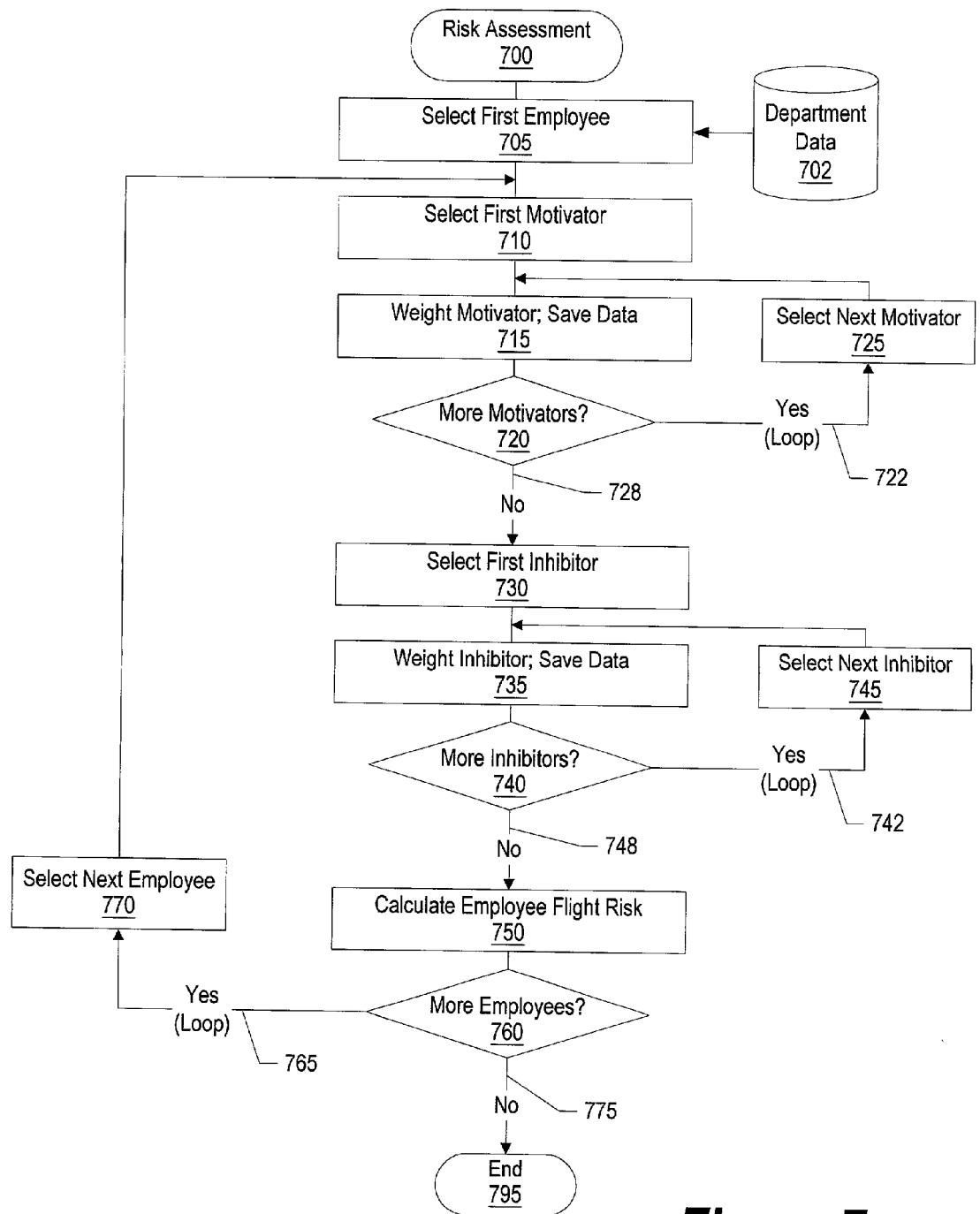
FIG. 7 is a flowchart showing a manager identifying employees' motivators and inhibitors and the People Planner System used to determine flight risks of individual employees.

FIG. 7 is a flowchart showing a manager identifying employees' motivators and inhibitors and the People Planner System used to determine flight risks of individual employees. Processing commences at 700 whereupon the first employee is selected (step 705) from department data 702 stored in the People Planner System.

The manager selects the first motivator for the selected employee (step 710). As the name implies, motivators are factors that motivate the selected employee in his or her job. Examples of motivators include autonomy, base salary, communication, decision making authority, degree of challenge, geographic location, immediate management, monetary recognition, and opportunity for advancement. By the manager's understanding of the employee's likes and dislikes and from discussions or feedback received from the employee, the manager determines what motivates the employee and what inhibits, or hinders, the employee. If the selected employee is motivated by autonomy, the manager selects autonomy as a motivator and then applies a weight, or level of importance, to the motivator (step 715). If an employee is greatly motivated by autonomy, a greater weight is applied to the motivator. The motivator and corresponding weight are saved in the employee's People Planner Data for future use in calculating the employee's flight risk.

A determination is made as to whether there are other motivators corresponding to the employee (decision 720). If there are more motivators, decision 720 branches to "yes" branch 722 whereupon the next motivator is selected (step 725) and a weight is applied (step 715). This looping continues until there are no more motivators to apply to the employee at which time decision 720 branches to "no" branch 728 whereupon the process repeats for identifying inhibitors that apply to the employee.

The manager selects the first inhibitor for the selected employee (step 730)). As the name implies, inhibitors are factors that inhibit the selected employee in his or her job. Examples of inhibitors include autonomy, base salary, communication, decision making authority, degree of challenge, geographic location, immediate management, monetary recognition, and opportunity for advancement. By the manager's understanding of the employee's likes and dislikes and from discussions or feedback received from the employee, the manager determines what inhibits, or hinders, the employee. If the selected employee is inhibited by opportunity for advancement, the manager selects opportunity for advancement as a inhibitor and then applies a weight, or level of importance, to the inhibitor (step 735). If an employee is greatly inhibited by opportunity for advancement, a greater weight is applied to the inhibitor. The inhibitor and corresponding weight are saved in the employee's People Planner Data for future use in calculating the employee's flight risk.

A determination is made as to whether there are other inhibitors corresponding to the employee (decision 740). If there are more inhibitors, decision 740 branches to "yes" branch 742 whereupon the next inhibitor is selected (step 745) and a weight is applied (step 735). This looping continues until there are no more inhibitors to apply to the employee at which time decision 740 branches to "no" branch 748.

The employee's flight risk is calculated (step 750) after the employee's motivators and inhibitors have been identified and weighed. The calculation may be performed by the manager by displaying the list of the employee motivators and inhibitors arranged by weighted value and providing the manager with employee data, such as salary data and job descriptions, to aid the manager in determining a flight risk value by comparing and contrasting the employee's motivators and inhibitors with the employees current circumstances. The flight risk calculation can also be computed using historical modeling data to compare the employee's motivators, inhibitors, and current job situation with other that have left the company. A strong similarity between the employee's profile and employees that left the organization results in a higher flight risk, while a weaker similarity results in a correspondingly lower flight risk.

A determination is made as to whether there are more employees for which the manager needs to assess risk (decision 760). If there are more employees, decision 760 branches to "yes" branch 765 which selects (step 770) the next employee from department data 702 and loops back to analyze the employee. This looping continues until all employees have been analyzed, at which time decision 760 branches to "no" branch 775 whereupon processing ends at 795.

Figure 8:
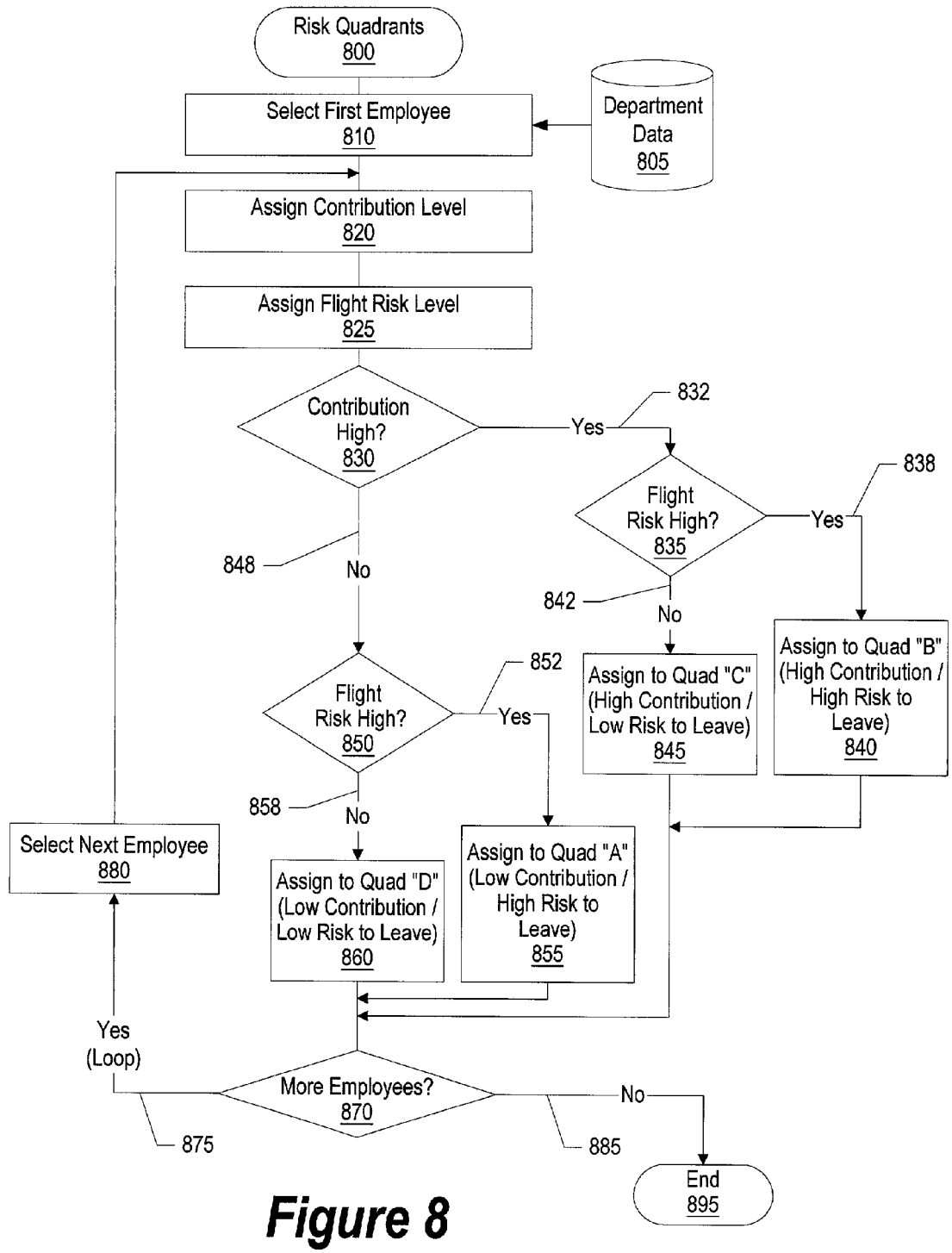
FIG. 8 is a flowchart used to group employees into contribution/flight risk quadrants for risk assessment.

FIG. 8 is a flowchart of logic used to group employees into contribution/flight risk quadrants for risk assessment. Processing commences at 800 whereupon the first employee is selected (step 810) from department data 805 stored in the People Planner System.

The employee's contribution level is assigned (step 820). In one embodiment, the employee's contribution level is assigned by performing an employee evaluation process integrated with the People Planner System, such as the process described in FIG. 6. The employee's flight risk is also assigned (step 825). In one embodiment, the employee's flight risk is assigned by performing an risk assessment process integrated with the People Planner System, such as the process described in FIG. 7.

Determinations are made based on the employee's contribution level and flight risk in order to assign a "risk quadrant" to the employee. Risk quadrants therefore include: employees with low contribution to the organization and high risk to leave the organization (quadrant "A"), employees with high contribution to the organization and high risk to leave the organization (quadrant "B"), employees with high contribution to the organization and low risk to leave the organization (quadrant "C"), and employees with low contribution to the organization and low risk to leave the organization (quadrant "D"). Grouping employees into risk quadrants aids management, especially upper management, in analyzing large groups of employees, such as a site location, and determining whether future attrition problems are likely based on the percentage of employees in quadrant "A" and especially quadrant "B." If problem areas exist, management can analyze employees in a given quadrant to determine if common inhibitors or motivators exist that can be used to encourage employees to remain with the organization.

A determination is made as to whether the selected employee's contribution to the organization is "high" (decision 830). If the manager indicates that the selected employee's contribution is high, decision 830 branches to "yes" branch 832 whereupon a decision is made as to whether, based on the employee's inhibitors and motivators, the employee presents a flight risk to the organization (decision 835). If the employee presents a flight risk, decision 835 branches to "yes" branch 838 whereupon the employee is assigned (step 840) to quadrant "B" indicating a high contributor presenting a high flight risk to the organization. On the other hand, if the employee does not present a flight risk, decision 835 branches to "no" branch 842 whereupon the employee is assigned (step 845) to quadrant "C" indicating a high contributor presenting a low flight risk to the organization.

Returning to decision 830, if the selected employee's contribution to the organization is not "high", decision 830 branches to "no" branch 848 whereupon a decision is made as to whether, based on the employee's inhibitors and motivators, the employee presents a flight risk to the organization (decision 850). If the employee presents a flight risk, decision 850 branches to "yes" branch 852 whereupon the employee is assigned (step 855) to quadrant "A" indicating a low contributor presenting a high flight risk to the organization. On the other hand, if the employee does not present a flight risk, decision 850 branches to "no" branch 858 whereupon the employee is assigned (step 860) to quadrant "D" indicating a low contributor presenting a low flight risk to the organization.

A determination is made as to whether there are more employees that need to be assigned to a risk quadrant (decision 870). If there are more employees, decision 870 branches to "yes" branch 875 which selects (step 880) the next employee from department data 805 and loops back to assign the employee to a risk quadrant. This looping continues until all employees have been analyzed, at which time decision 870 branches to "no" branch 885 whereupon processing ends at 895.

Figure 9:
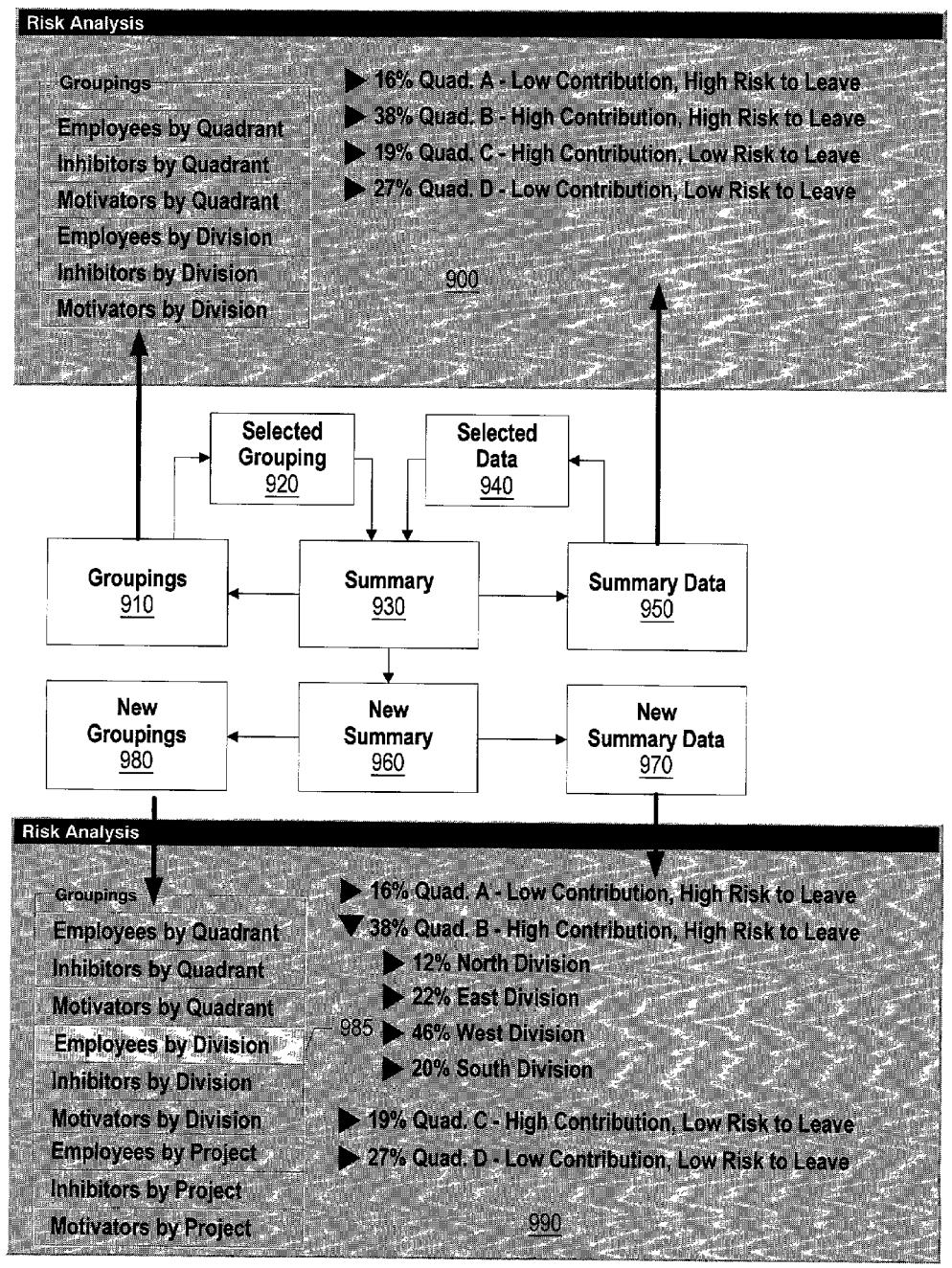
FIG. 9 is a user interface and logic for organizational risk analysis concerning employees.

FIG. 9 is a user interface and logic for organizational risk analysis concerning employees. Screen 900 shows a risk analysis summary showing the percentage of employees that were assigned to the various risk quadrants. Screen 900 includes groupings 910 and summary data 950. The user selects one of the groupings and a summary data item. Selected grouping 920 and selected data 940 are used by summary process 930 to create new summary process 960 which has new groupings 980 based upon the previously selected grouping. New summary 960 also includes new summary data 970 based upon the previously chosen grouping and summary data item. The new summary, including new groupings 980 and new summary data 970 are displayed in screen 990. In the example shown, the user selected the grouping 985 ("Employees by Division") and selected the B quadrant. The division breakdown for the "B" quadrant is therefore shown in screen 990. Further groupings and selected data items can be selected to more fully understand the risk analysis data.

Figure 10:
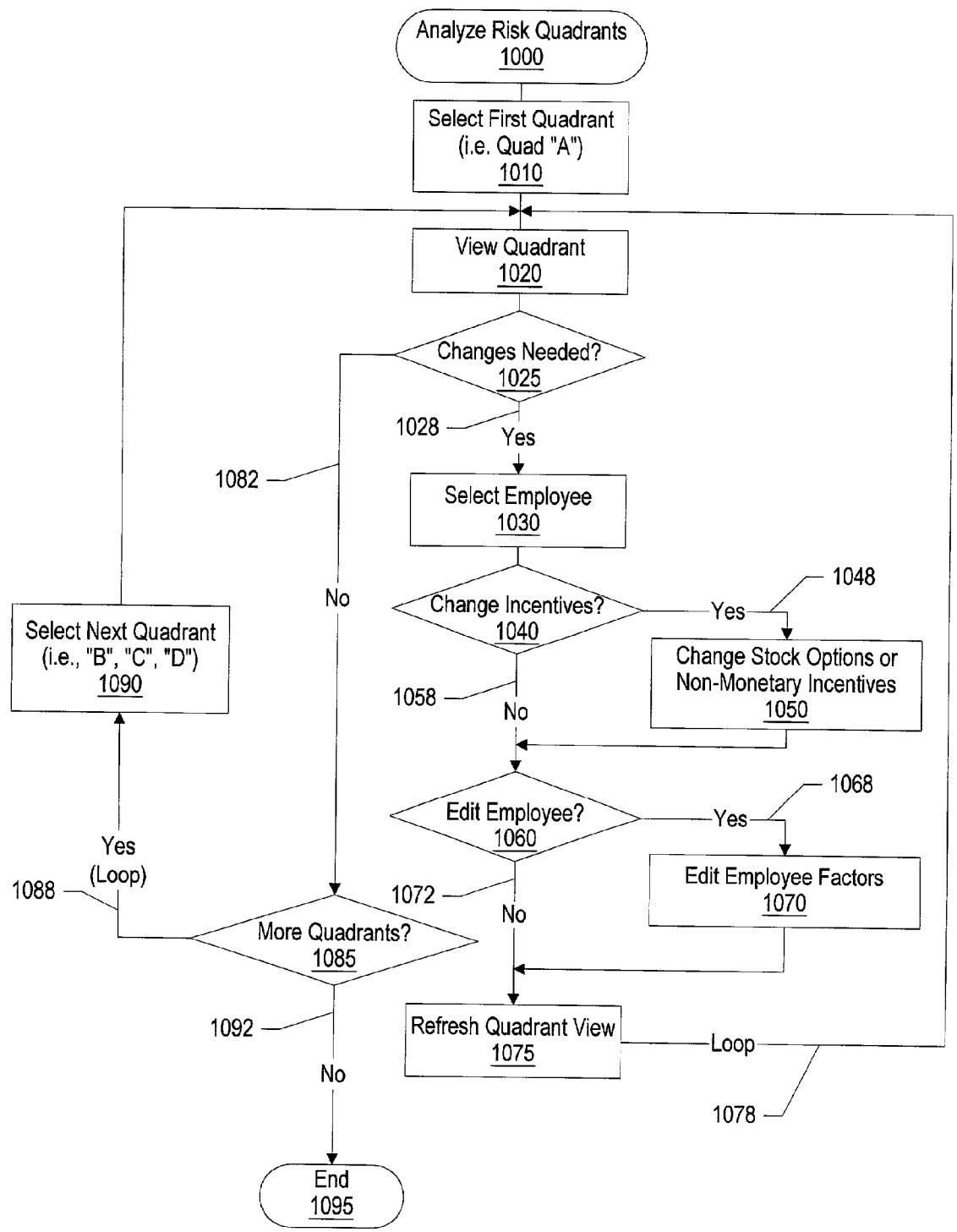
FIG. 10 is a flowchart used to analyze risk quadrants and act upon identified employees.

FIG. 10 is a flowchart used to analyze risk quadrants and act upon identified employees. Processing commences at 1000 whereupon the first risk quadrant (i.e. Quadrant "A") is selected (step 1010). The selected quadrant is displayed to the manager (step 1020, see FIG. 9, screen 900 for an example quadrant view). The manager analyzes the risk quadrant data to determine whether changes are needed (step 1025, see FIG. 9, screen 990 for an example of analyzing risk quadrants). Risk quadrants can be analyzed down to viewing the group of employees that are included in a particular risk quadrant. A determination is made by the manager is changes are needed to any employees within the currently viewed risk quadrant (decision 1025). If changes are needed, decision 1025 branches to "yes" branch 1028 whereupon an employee in the risk quadrant is selected (step 1030). A determination is made as to whether changes are needed to the employee's incentives (decision 1040). If changes are needed to the selected employee's incentives, decision 1040 branches to "yes" branch 1048 whereupon the manager makes changes to the employee's planned nomination for stock options or other non-monetary award incentives designed to retain employees (step 1048). If changes are not needed to the selected employee's incentives, decision 1040 branches to "no" branch 1058 bypassing changes to the employee's stock options and non-monetary awards.

Another determination is made as to whether to edit the employee data, such as risk planning data (decision 1060). This determination may be in light of seeing the employee in a quadrant that does not match manager's knowledge of the employee or in light of new information learned about the employee's inhibitors or motivators. In addition, this decision might be made because of a recent or dramatic change in the employee's contribution or value to the organization based on newly acquired skills or experiences. If changes are needed to the employee's People Planner Data, decision 1060 branches to "yes" branch 1068 whereupon the manager edits one or more employee planning factors (step 1070). On the other hand, if the manager does not need to edit the employee's planning factors, decision 1060 branches to "no" branch 1072 bypassing the edit employee planning factors step.

After changes are made to the selected employee the quadrant data view is updated to reflect the changed information (step 1075) and processing returns (loop 1078) to view the quadrant information. This looping continues until no changes are needed, at which point decision 1025 branches to "no" branch 1082.

A determination is made as to whether there are more quadrants to analyze (decision 1085). If there are more quadrants to analyze, decision 1085 branches to "yes" branch 1088 whereupon the next quadrant is selected (step 1090) and processing loops back to analyze the selected quadrant. This looping continues until there are no more quadrants to analyze, at which point decision 1085 branches to "no" branch 1092 and risk analysis processing ends at 1095.

Figure 11:
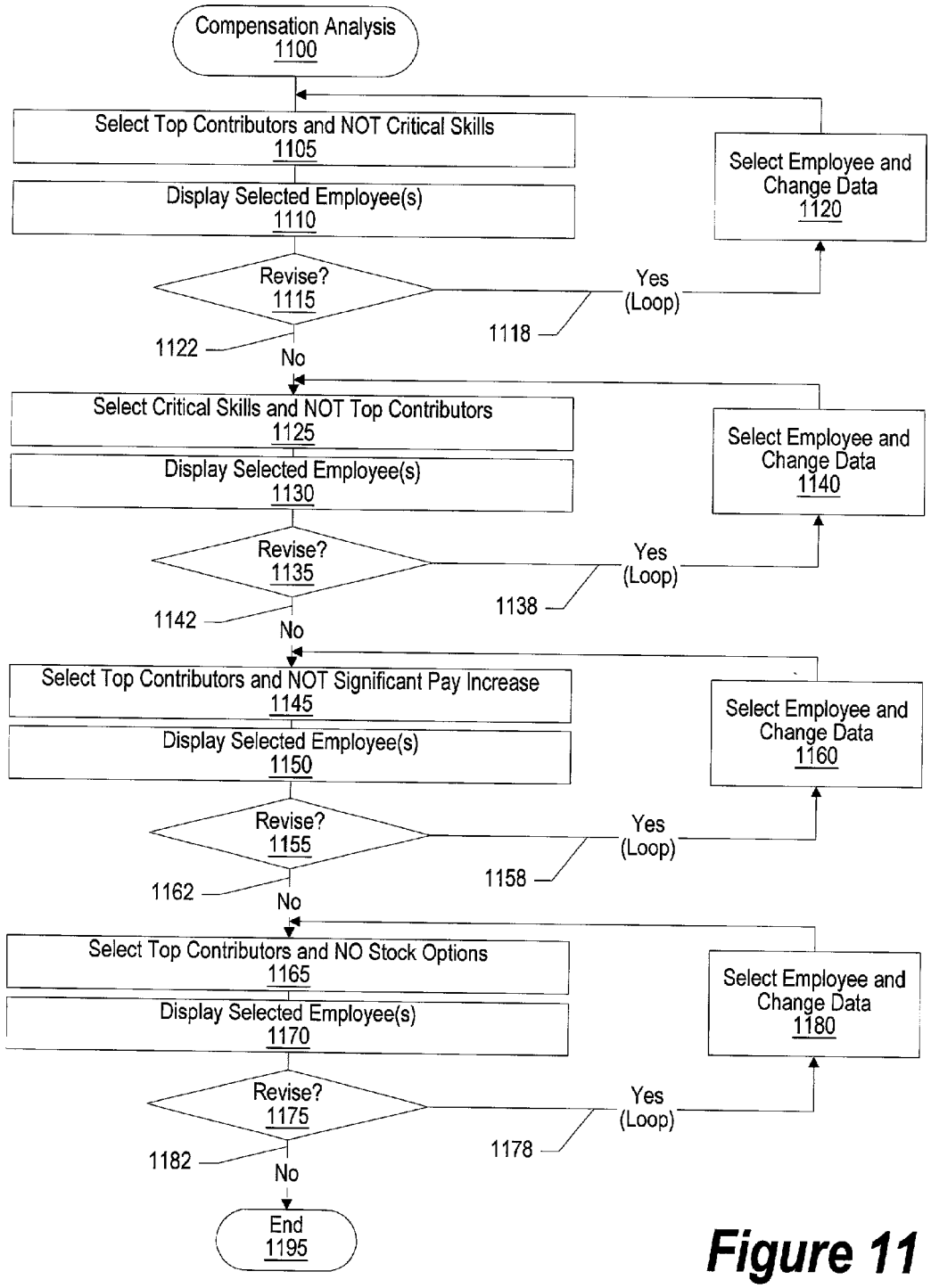
FIG. 11 is a flowchart used to analyze compensation of high contributing employees.

FIG. 11 is a flowchart used to analyze compensation of high contributing employees. The immediate (i.e., department) manager may perform the analysis in addition to higher level managers and HR personnel checking the fairness of employee evaluations.

Processing commences at 1100 whereupon the People Planner System selects top contributing employees that have not been identified as having critical skills (step 1105). Top contributing employees often have critical skills that make them valuable, and therefore high contributors, to the organization. This selection helps management analyze why an employee has been identified as a top contributor without critical skills. It may be that the employee's critical skills were not noted or that the employee was incorrectly identified as a top contributor. In some cases, it may simply be that an employee without critical skills is a top contributor because of the employee's work ethic and ability to handle more tasks in a high quality manner. The selected employees are displayed to the manager (step 1110). The manager views the selected employees and can view detailed data regarding the employees. A determination is made as to whether an employee's data in the People Planner System needs to be changed in light of the displayed data (decision 1115). If an employee's data needs to be changed, decision 1115 branches to "yes" branch 1118 whereupon an employee is selected and data pertaining to the employee is changed (step 1120) and processing loops back to re-analyze the group in light of the changed data. This looping continues until no employee data needs to be revised, at which time decision 1115 branches to "no" branch 1122.

Another selection identifies employees having critical skills that have not been identified as top contributing employees (step 1125). This is the reverse situation as the selection performed in step 1105. The selected employees are displayed to the manager (step 1130). The manager views the selected employees and can view detailed data regarding the employees. A determination is made as to whether an employee's data in the People Planner System needs to be changed in light of the displayed data (decision 1135). If an employee's data needs to be changed, decision 1135 branches to "yes" branch 1138 whereupon an employee is selected and data pertaining to the employee is changed (step 1140) and processing loops back to re-analyze the group in light of the changed data. This looping continues until no employee data needs to be revised, at which time decision 1135 branches to "no" branch 1142.

A further selection identifies employees identified as top contributing employees that are not receiving a significant pay increase (step 1145). Top contributing employees need to be rewarded for their efforts. In some cases, analysis of an employee in this group may reveal an employee that, for some reason, is currently overpaid in light of the employee's position, job title, and level and therefore does not require a significant salary increase. In other cases, an oversight may have occurred in not planning significant salary increases for top contributing employees. The selected employees are displayed to the manager (step 1150). The manager views the selected employees and can view detailed data regarding the employees. A determination is made as to whether an employee's data in the People Planner System needs to be changed in light of the displayed data (decision 1155). If an employee's data needs to be changed, decision 1155 branches to "yes" branch 1158 whereupon an employee is selected and data pertaining to the employee is changed (step 1160) and processing loops back to re-analyze the group in light of the changed data. This looping continues until no employee data needs to be revised, at which time decision 1155 branches to "no" branch 1162.

Another selection identifies employees identified as top contributing employees that are not receiving a grant of stock options (step 1165). Top contributing employees need to be rewarded for their efforts and stock options present an incentive for such top contributing employees to remain at the company. In some cases, analysis of an employee in this group may reveal an employee that does not warrant a stock option grant. For example, an high contributing employee with little flight risk may prefer awards and greater salary increases instead of stock options. In other cases, an oversight may have occurred in not planning stock option awards for top contributing employees. The selected employees are displayed to the manager (step 1170). The manager views the selected employees and can view detailed data regarding the employees. A determination is made as to whether an employee's data in the People Planner System needs to be changed in light of the displayed data (decision 1175). If an employee's data needs to be changed, decision 1175 branches to "yes" branch 1178 whereupon an employee is selected and data pertaining to the employee is changed (step 1180) and processing loops back to re-analyze the group in light of the changed data. This looping continues until no employee data needs to be revised, at which time decision 1175 branches to "no" branch 1182 whereupon this phase of compensation planning ends at 1195.

Figure 12:
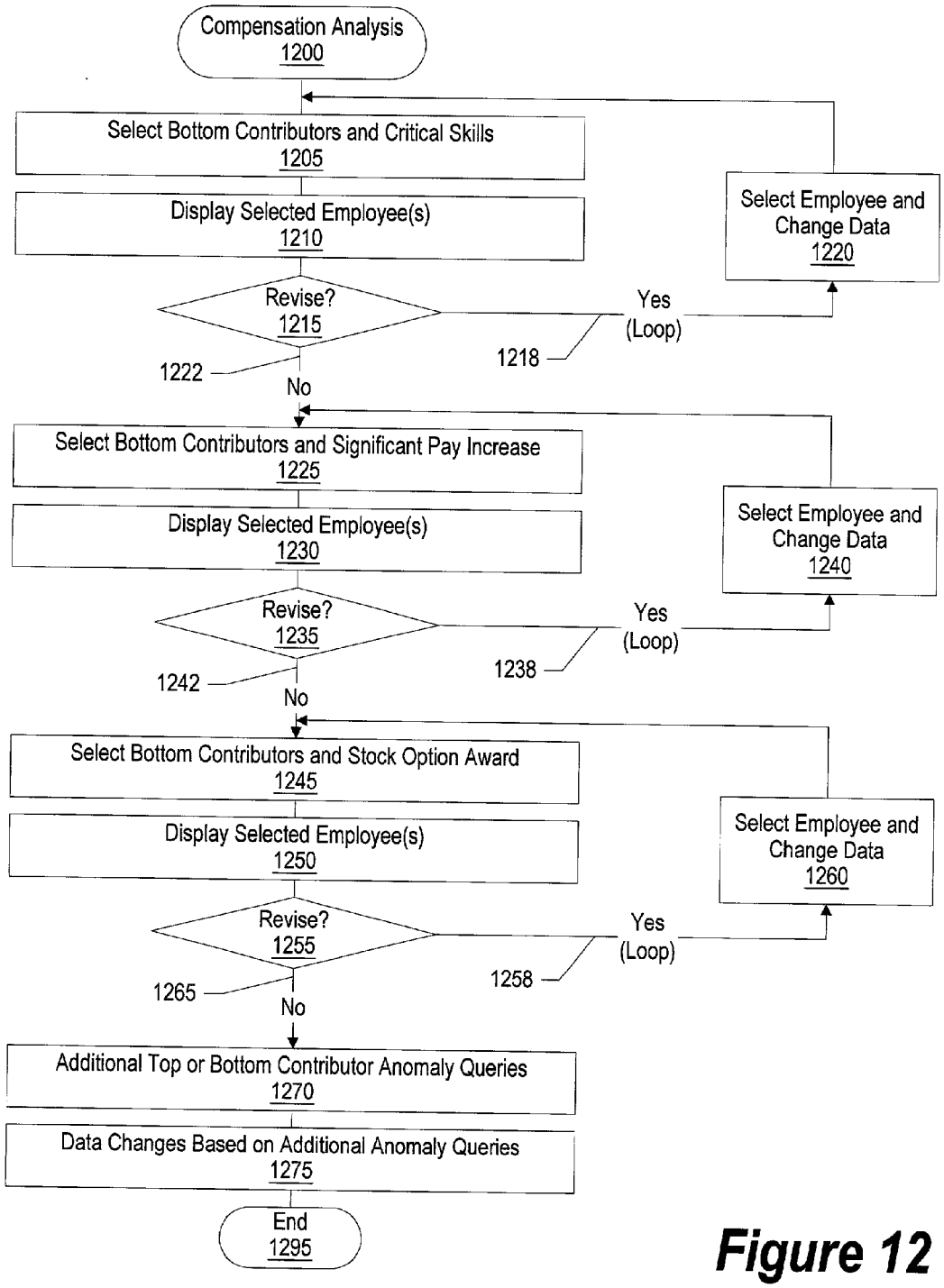
FIG. 12 is a flowchart used to analyze compensation of low contributing employees.

FIG. 12 is a flowchart used to analyze compensation of low contributing employees and to query additional anomalies with high and low contributors. The immediate (i.e., department) manager may perform the analysis in addition to higher level managers and HR personnel checking the fairness of employee evaluations.

Processing commences at 1200 whereupon the People Planner System selects low contributing employees that have been identified as having critical skills (step 1205). Low contributing employees often do not have critical skills. This selection helps management analyze why an employee has been identified as a low contributor with critical skills. It may be that the employee's critical skills were incorrectly noted or that the employee was incorrectly identified as a low contributor. In some cases, it may simply be that an employee with critical skills is a low contributor because of the employee's work ethic or attitude and inability to handle tasks in a quality manner. The selected employees are displayed to ID the manager (step 1210). The manager views the selected employees and can view detailed data regarding the employees. A determination is made as to whether an employee's data in the People Planner System needs to be changed in light of the displayed data (decision 1215). If an employee's data needs to be changed, decision 1215 branches to "yes" branch 1218 whereupon an employee is selected and data pertaining to the employee is changed (step 1220) and processing loops back to re-analyze the group in light of the changed data. This looping continues until no employee data needs to be revised, at which time decision 1215 branches to "no" branch 1222.

Another selection identifies employees identified as low contributing employees that are receiving a significant pay increase (step 1225). Low contributing employees typically are not rewarded as handsomely as higher contributing employees. In some cases, analysis of an employee in this group may reveal a low contributing employee that, for some reason, is currently underpaid in light of the employee's position, job title, and level and therefore requires a significant salary increase. In other cases, an oversight may have occurred in planning significant salary increases for low contributing employees. The selected employees are displayed to the manager (step 1230). The manager views the selected employees and can view detailed data regarding the employees. A determination is made as to whether an employee's data in the People Planner System needs to be changed in light of the displayed data (decision 1235). If an employee's data needs to be changed, decision 1235 branches to "yes" branch 1238 whereupon an employee is selected and data pertaining to the employee is changed (step 1240) and processing loops back to re-analyze the group in light of the changed data. This looping continues until no employee data needs to be revised, at which time decision 1235 branches to "no" branch 1242.

A further selection identifies employees identified as low contributing employees that are receiving a grant of stock options (step 1245). Analysis of these employees may reveal an employees that do not warrant stock option grants. It may also be revealed that some employees in this group are not low contributors and have been identified as such incorrectly. The selected employees are displayed to the manager (step 1250). The manager views the selected employees and can view detailed data regarding the employees. A determination is made as to whether an employee's data in the People Planner System needs to be changed in light of the displayed data (decision 1255). If an employee's data needs to be changed, decision 1255 branches to "yes" branch 1258 whereupon an employee is selected and data pertaining to the employee is changed (step 1260) and processing loops back to re-analyze the group in light of the changed data. This looping continues until no employee data needs to be revised, at which time decision 1255 branches to "no" branch 1262.

Further top and bottom contributor queries can be performed to further identify anomalies with the planning factors currently in place for individual employees (step 1270). People Planner Data pertaining to these employees can be changed as needed to better reflect the employees' contributions and rewards and compensation for such contributions (step 1280). Compensation planning thereafter ends at 1295.

Figure 13:
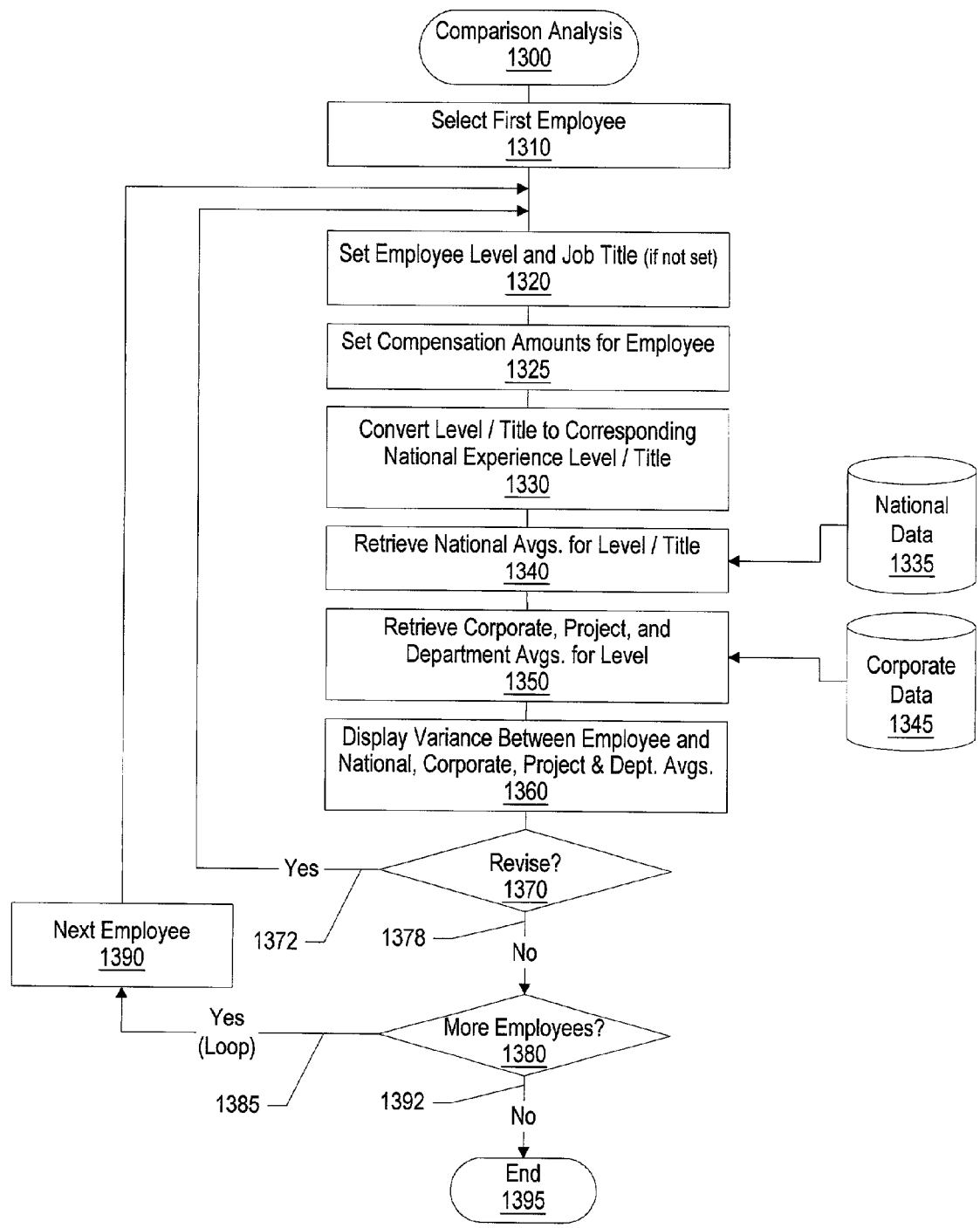
FIG. 13 is a flowchart showing details involved with comparing employees' compensation using benchmark information.

FIG. 13 is a flowchart showing details involved with comparing employees' compensation using benchmark information. Processing commences at 1300 whereupon the first employee in a group, such as a department or project, being analyzed is selected (step 1310). From prior People Planner System processes, the employee should already have a job level and job title, however if the employee is new or otherwise does not have a level and job title this data is supplied to the People Planner System and stored in the employee's People Planner Data area (step 1320). In addition, compensation levels should already be set for the employee's current compensation and salary planning data for the employee's next pay increase may already be stored in the People Planner System. If the employee does not have a current salary, then the employee's current compensation amounts are entered into the People Planner System (step 1325).

The employee's job title and level (i.e., "Senior Programmer") are converted to a corresponding national or geographic job title and level (i.e., "software programmer with 5 or more years of experience") using a table relating the company's job titles and levels to nationally recognized titles and levels (step 1330). The national job title and level is used to search (step 1340) national or geographic employment data 1335 for national averages and other data about national salary ranges for the job title and level (i.e., average salary for first, second, third and fourth quartiles, etc.). Other averages are retrieved from the People Planner System for the salary data regarding the employee's job title and level within the organization (step 1350). This data may be for the organization as a whole, the employee's site, project, or department or combinations thereof.

Variances between the employees actual (and possibly planned) compensation and various retrieved national and organizational benchmarks is displayed to management or human resources personnel (step 1360). Large variances indicating that an employee is underpaid may warrant changing the employee's planning data, for example to identify the employee for a significant increase, to get the employees salary in line with the benchmark data. A determination is made as to whether the employee's data needs to be revised (decision 1370). If the employee's data needs to be revised, decision 1370 branches to "yes" branch 1372 which loops back to enable management or human resources to reset employee information (i.e., compensation amounts) and redisplay the new planning factors in comparison with the available benchmarks. This looping continues until no further revisions to the employee's data are needed, at which point decision 1370 branches to "no" branch 1378 whereupon a determination is made as to whether there are more employees to analyze (decision 1380).

If there are more employees to analyze, decision 1380 branches to "yes" branch 1385 which selects the next employee (step 1390) and loops back to perform a comparison analysis for the selected employee. This looping continues until no more employees in the selected group need to be processed, at which time decision 1380 branches to "no" branch 1392 and processing ends at 1395.

Figure 14:
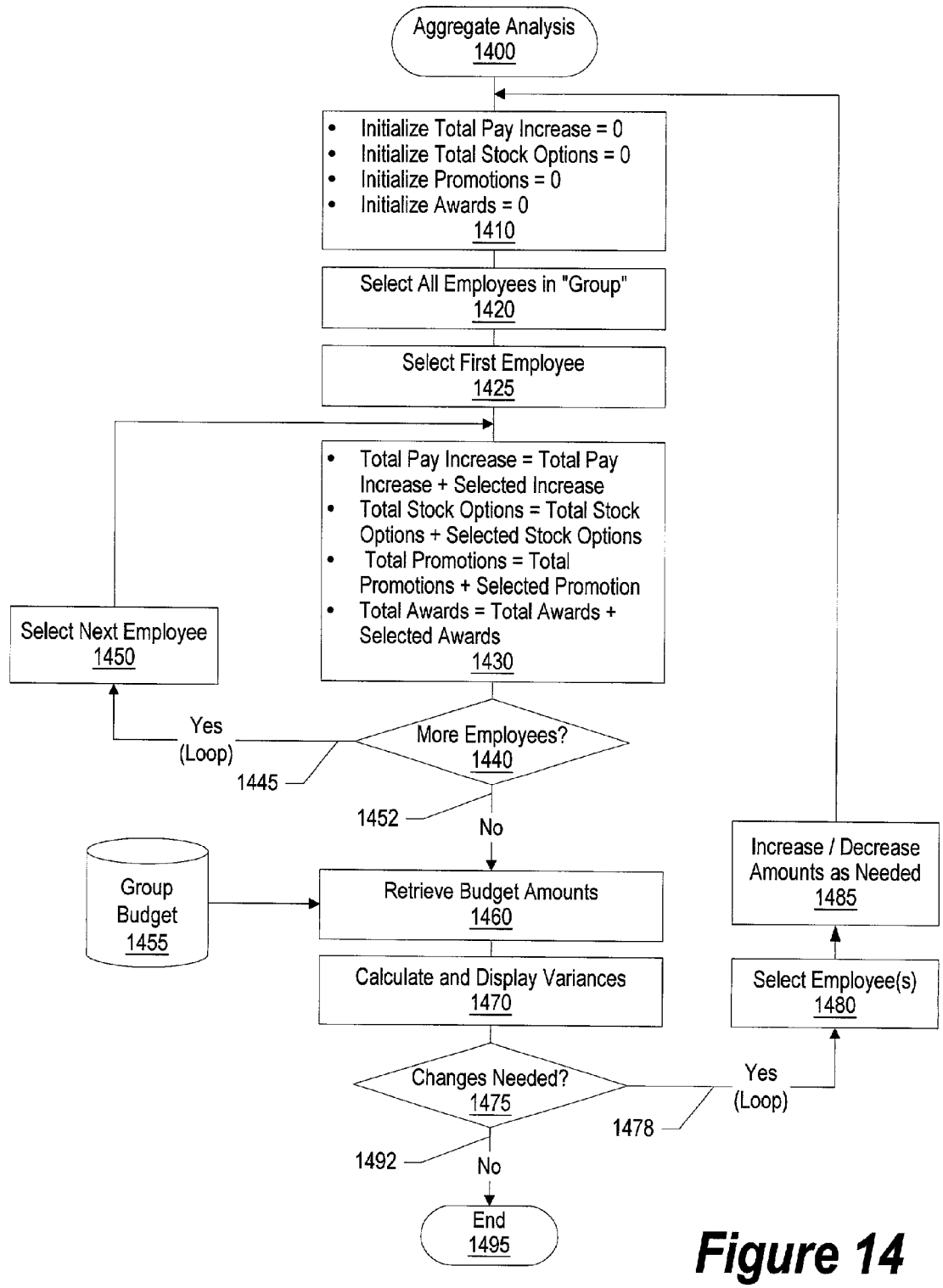
FIG. 14 is a flowchart showing details involved with aggregate analysis of a department or area and comparison against budgetary requirements.

FIG. 14 is a flowchart showing details involved with aggregate analysis of a department or area and comparison against budgetary requirements. Processing commences at 1400 whereupon various compensation counters, such as total pay increases, total stock options, total promotions, and total awards, are initialized to zero (step 1410). People Planner Data for all employees within a particular group, such as a project or department, are selected from the People Planner Data (step 1420). The first employee from the selected group is selected (step 1425). The counters for planned pay increases, stock options, promotions and awards are accumulated by adding the current value of such counters to the planned pay increase, planned stock option grant, planned promotion, and planned awards for the currently selected employee (step 1430). A determination is made as to whether more employees exist in the group to be processed (decision 1440). If more employees exist, decision 1440 branches to "yes" branch 1445 and the next employee in the group is selected (step 1450) and processing loops back to add the selected employees compensatory information to the running totals stored in the counters. This looping continues until all employees in the group have been processed and all planned pay increases, stock awards, promotions, and awards have been totaled. When all employees have been processed, decision 1440 branches to "no" branch 1452 whereupon budget amounts are retrieved (step 1450) from group budget data 1455 (such as a department or project budget). Variances between the planned salary increases, stock awards, promotions, and awards and budgeted amounts are calculated and displayed (step 1470). A determination is made, based on the displayed variances, as to whether changes are needed to employee planning factors to rectify any variances (decision 1475). If changes are needed, decision 1475 branches to "yes" branch 1478 which allows management or human resources personnel to select one or more employees (step 1480), increase or decrease planned salary increases, stock awards, promotions, and awards (step 1485), and loop back to the beginning to reprocess the group and determine any further variances and changes needed. This looping continues until variances have been rectified and further changes to employee data is not needed, at which point decision 1475 branches to "no" branch 1492 and processing ends at 1495.

Figure 15:
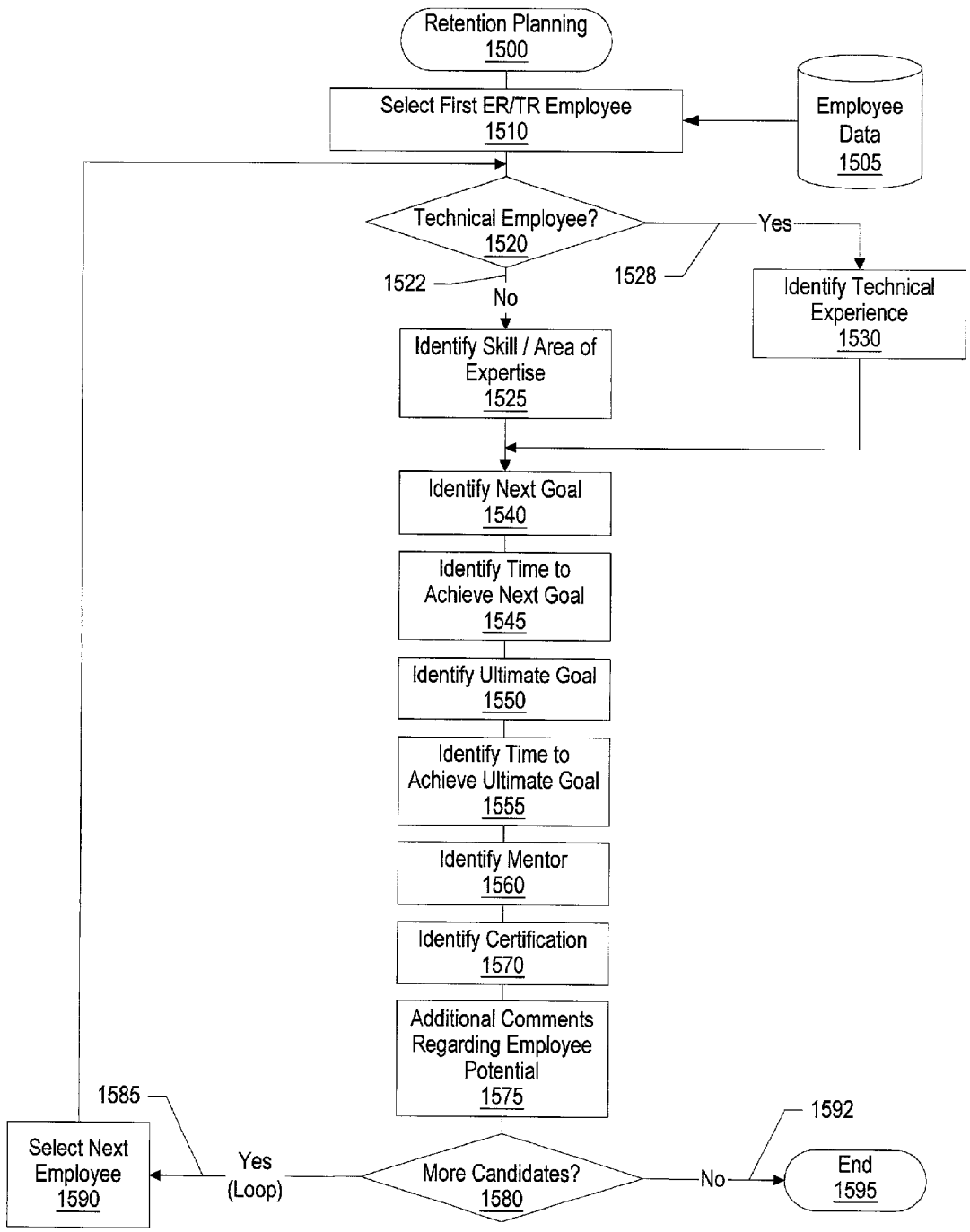
FIG. 15 is a flowchart for identifying key employees and performing retention analysis for identified employees.

FIG. 15 is a flowchart for identifying key employees and performing retention analysis for identified employees. Processing commences at 1500 whereupon a first employee is selected (step 1510) from employee data 1505. A determination is made as to whether the selected employee is a technical employee or identified as a potential executive candidate (decision 1520). If the employee is identified as a possible key technical employee, decision 1520 branches to "yes" branch 1528 whereupon the employee's technical experience is identified and stored in the People Planner System (step 1530). On the other hand, if the employee is identified as a potential executive candidate, decision 1520 branches to "no" branch 1522 whereupon the employee's skill and areas of expertise are identified (step 1525).

The next career goal for the selected employee is identified (step 1540) along with the expected amount of time planned for the employee to achieve the next goal (step 1545). The employee's ultimate goal (i.e., "Chief Technical Architect," "Division Vice President," etc.) is identified (step 1550) along with the expected amount of time planned for the employee to achieve the ultimate goal (step 1555). A mentor, such as an experienced employee in the organization, is identified for the employee (step 1560). In addition, special certification or training planned for the employee to reach the goals is identified (step 1570) along with any additional comments regarding the employee's potential. The identified information is stored in the employee's People Planner Data and used for long term management and direction of the employee.

A determination is made as to whether other potential key technical or executive candidates exist in the group (decision 1580). If more candidates exist in the group, decision 1580 branches to "yes" branch 1585 which selects the next employee candidate (step 1590) and loops back to process the next candidate. This looping continues until no more candidates are identified whereupon decision 1580 branches to "no" branch 1592 and processing ends at 1595.

Figure 16:
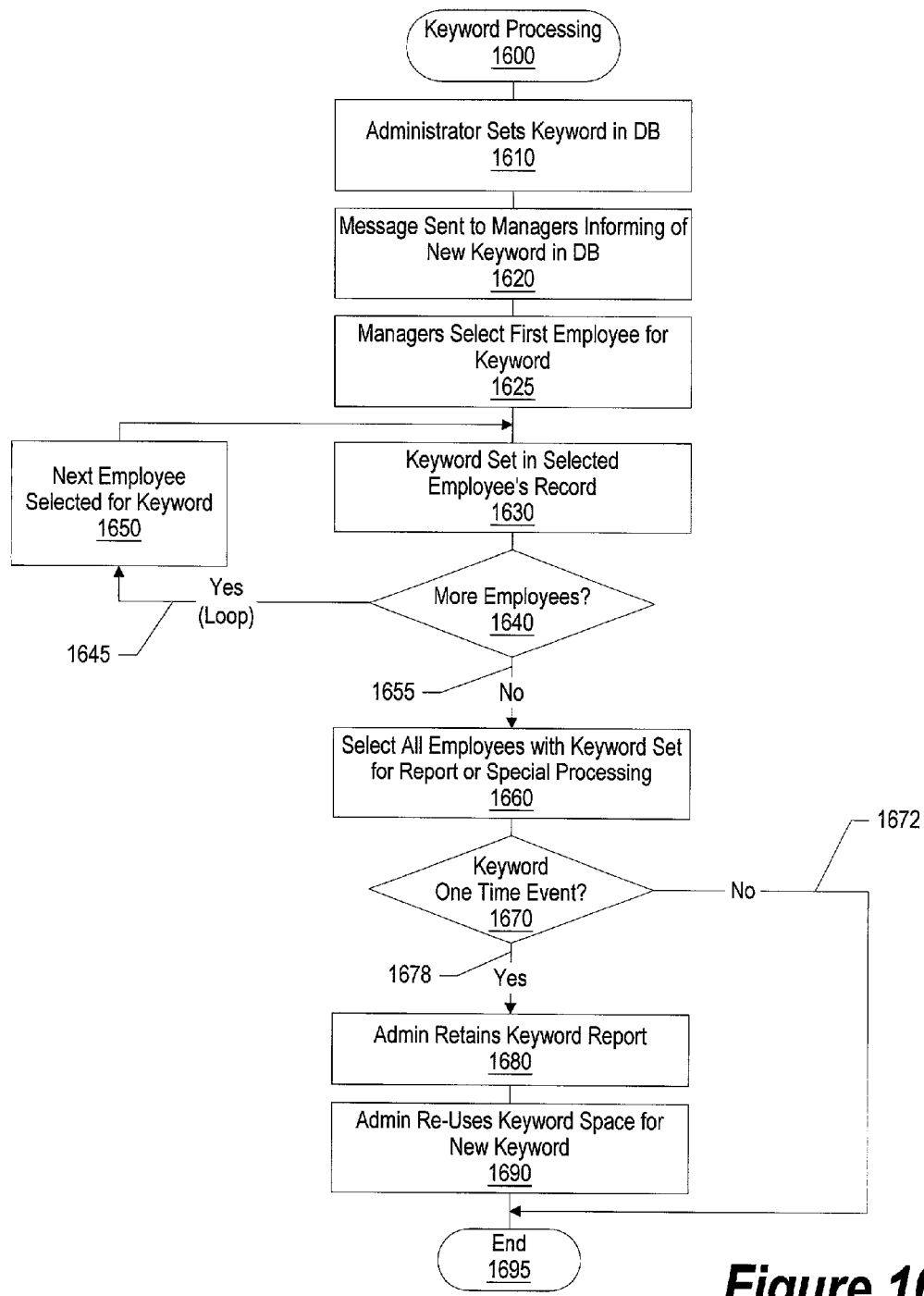
FIG. 16 is a flowchart showing tracking of additional keywords by the People Planner System to track organizational events and reporting on employees based on the additional keywords.

FIG. 16 is a flowchart showing tracking of additional keywords by the People Planner System to track organizational events and reporting on employees based on the additional keywords. Keywords can be added to the People Planner System to track data such as employees attending an important conference, employees selected for a special organizational retreat, employees nominated for special awards, or any other number of items that the organization wishes to track for employees.

Processing commences at 1600 whereupon an administrator defines one or more keywords in the People Planner System (step 1610). The People Planner System includes a notice area where notices about new keywords and other People Planner System changes are disseminated to management. An email message or the People Planner System notice area is used to inform management of the new keywords (step 1620). Management selects an employee for one of the newly defined keywords (step 1625). The keyword is set, or flagged, in the People Planner Data corresponding to the selected employee (step 1630). A determination is made as to whether more employees should be selected for the newly added keyword (decision 1640). This determination can be made over an amount of time and may be made by several different managers when analyzing their employees. If more employees should be selected for the keyword, decision 1640 branches to "yes" branch 1645 whereupon the next employee is selected for the keyword (step 1650) and processing loops back to set the keyword in the People Planner Data corresponding to the selected employee. This looping continues until no more employees are selected for the keyword whereupon decision 1640 branches to "no" branch 1655. Depending on the keyword a deadline may be established for a keyword so that employees are identified for the keyword before the deadline. For example, to prepare for a conference, a deadline typically exists for registering for the conference. At some point, a People Planner System administrator selects all employees that were selected for a particular keyword and reports or special processing takes place with the selected employees (step 1660). For example, if the keyword corresponds to a conference, the People Planner System would process the selected employees and send registrations for each employee to the conference coordinators. A determination is made as to whether the keyword corresponds to a one time event or an ongoing activity or event (decision 1670). If the keyword does not correspond to a one time event, decision 1670 branches to "no" branch 1672 bypassing the release of keyword space from the People Planner System. On the other hand, if the keyword corresponds to a one time event, decision 1670 branches to "yes" branch 1678 whereupon a People Planner System administrator retains a copy of a report or data file with the employees selected for the keyword (step 1680) and the administrator releases the data space used to store the keyword data so that it can be used for other keywords (step 1690). Keyword processing thereafter ends at 1695.

Figure 17A:
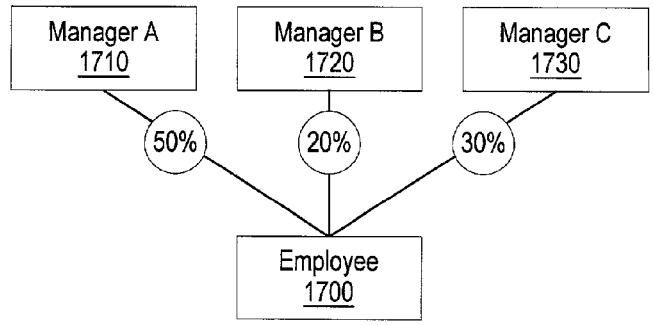
FIG. 17a is a diagram of an employee managed in a matrix organization with multiple managers.

FIG. 17a is a diagram of an employee managed in a matrix organization with multiple managers. In the example shown, employee 1700 reports to three different managers—manager A (1710), manager B (1720), and manager C (1730). Also shown are the effort, or activity, levels that the employee is expected to provide to the various managers' departments. In the example shown, employee 1700 spends fifty percent of his time working for manager A (1710), twenty percent of his time working for manager B (1720), and thirty percent of his time working for manager C (1730).

Figure 17B:
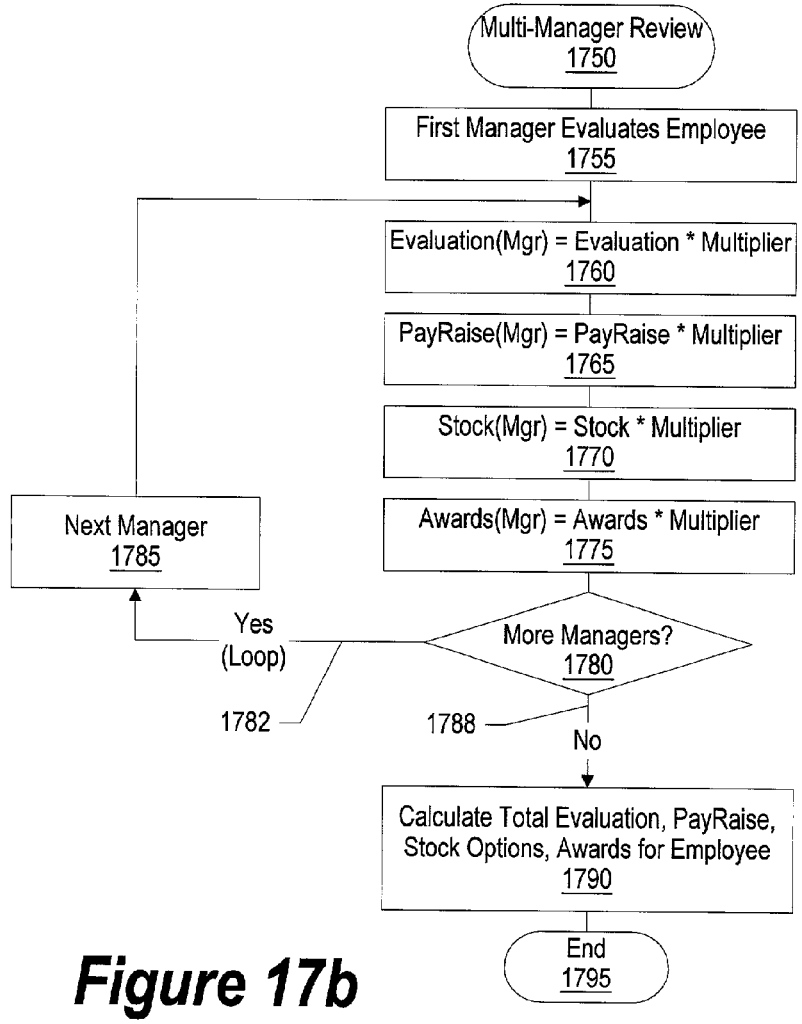
FIG. 17b is a flowchart used to evaluate and aware employees managed in a matrix organization with multiple managers.

FIG. 17b is a flowchart used to evaluate and aware employees managed in a matrix organization with multiple managers. Processing commences at 1750 whereupon the first manager evaluates the employee and provides salary increase, stock award, award, and evaluation ratings for the employee. The manager's evaluation is multiplied (step 1760) by a multiplier corresponding to the amount of work the employee performs for the manager (i.e. the work percentage discussed in FIG. 17a). Likewise, the manager's planning of the employee's pay increase is computed (step 1765), along with a stock award computation (step 1770), and an awards computation (step 1775). A determination is made as to whether additional managers need to evaluate the employee (decision 1780). If additional managers need to evaluate the employee, decision 1780 branches to "yes" branch 1782 whereupon the next manager evaluates the employee (step 1785) and processing loops back to multiply the next manager's evaluations and preplanning data with the multiplier corresponding to the manager. When all managers that manage the employee have performed evaluations, decision 1780 branches to "no" branch 1788 whereupon the employees total evaluation, salary increase, stock award, and other awards is computed by adding the various factors computed for each manager (step 1790). The People Planner System can also facilitate communication between managers that each manage a given employee so that a fair assessment of the employee's contributions can be made in light of the employee's efforts and complexity involved in working in multiple areas.

Figure 18A:
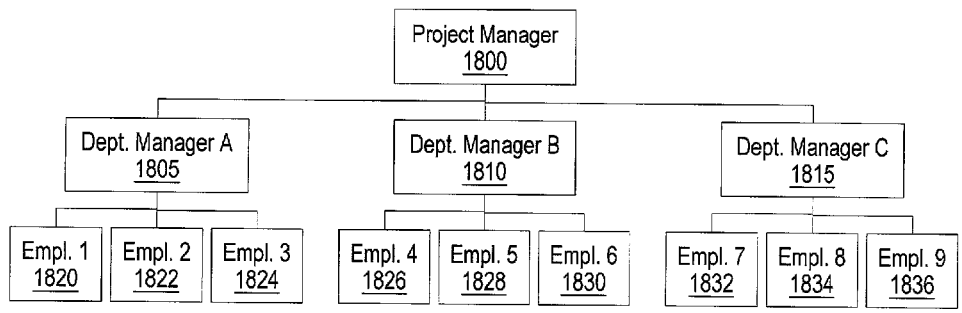
FIG. 18a is a sample three tier hierarchy chart showing employees and two layers of management.
Figure 18B:
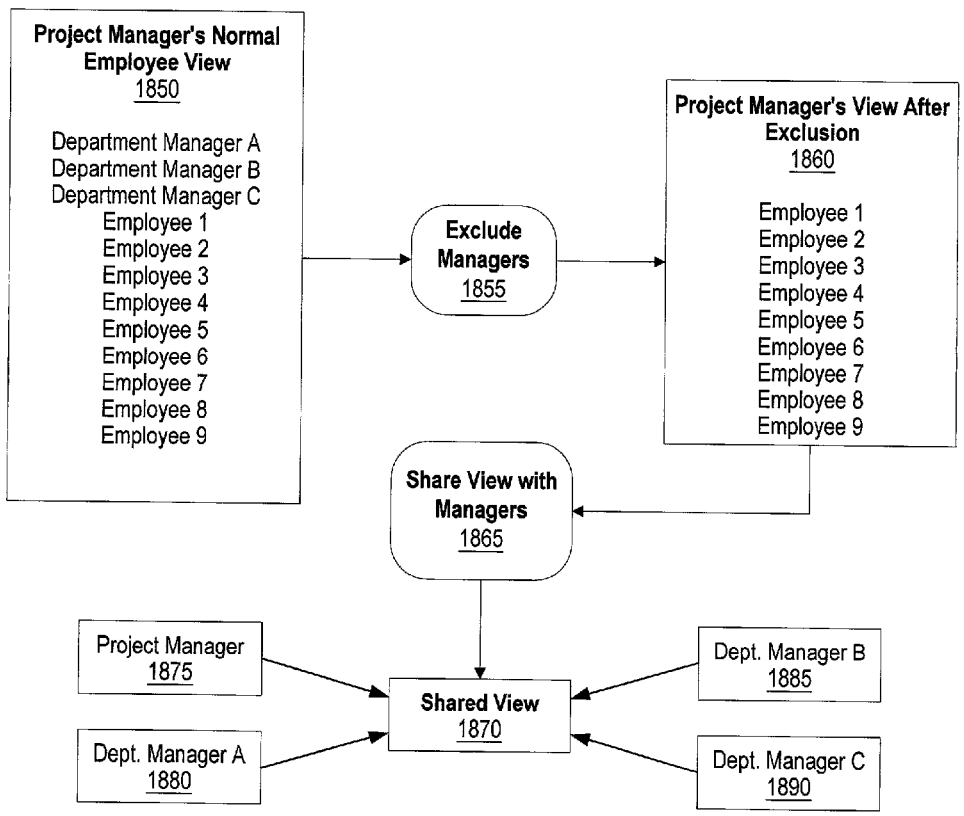
FIG. 18b is a diagram showing managers being excluded from a higher-level People Planner View.

FIG. 18a is a sample three tier hierarchy chart showing employees and two layers of management. Project manager 1800 has three managers reporting to her (department manager A (1805), department manager B (1810), and department manager C (1815)). Each of these department managers have three employees reporting to them. Employees 1 (1820), 2 (1822), and 3 (1824) report to department manager A (1805); Employees 4 (1826), 5 (1828), and 6 (1830) report to department manager B (1810)); and Employees 7 (1832), 8 (1834), and 9 (1836) report to department manager C (1815). If project manager 1800 wants to hold a management meeting to discuss employee contributions and planning factors, sharing her view with the department managers would allow the department managers to see confidential salary, compensation, and evaluation information pertaining to the other department managers. Instead, project manager 1800 can "exclude" the department managers from her view of people planner data to allow the management team to analyze the employee planning factors and evaluations without showing information regarding the department managers. FIG. 18b shows high level exclusion processing and FIG. 19 shows detailed processing involved with setting up shared views and excluding certain employees from the viewed information.

FIG. 18b is a diagram showing managers being excluded from a higher-level People Planner View. The project manager's normal view (1850) lists employees reporting to the project manager from the example shown in FIG. 18a including three department managers and nine employees reporting to the department managers. Exclude managers process 1855 is performed to create a new project managers view (1860) which lists the employees without listing the department managers. A granting process (1865) allows the project manager to share the new project manager's view (1860) with the department managers. The result is a shared project manager's view (1870) viewable by the project manager (1875), department manager A (1880), department manager B (1885), and department manager C (1890).

Figure 19:
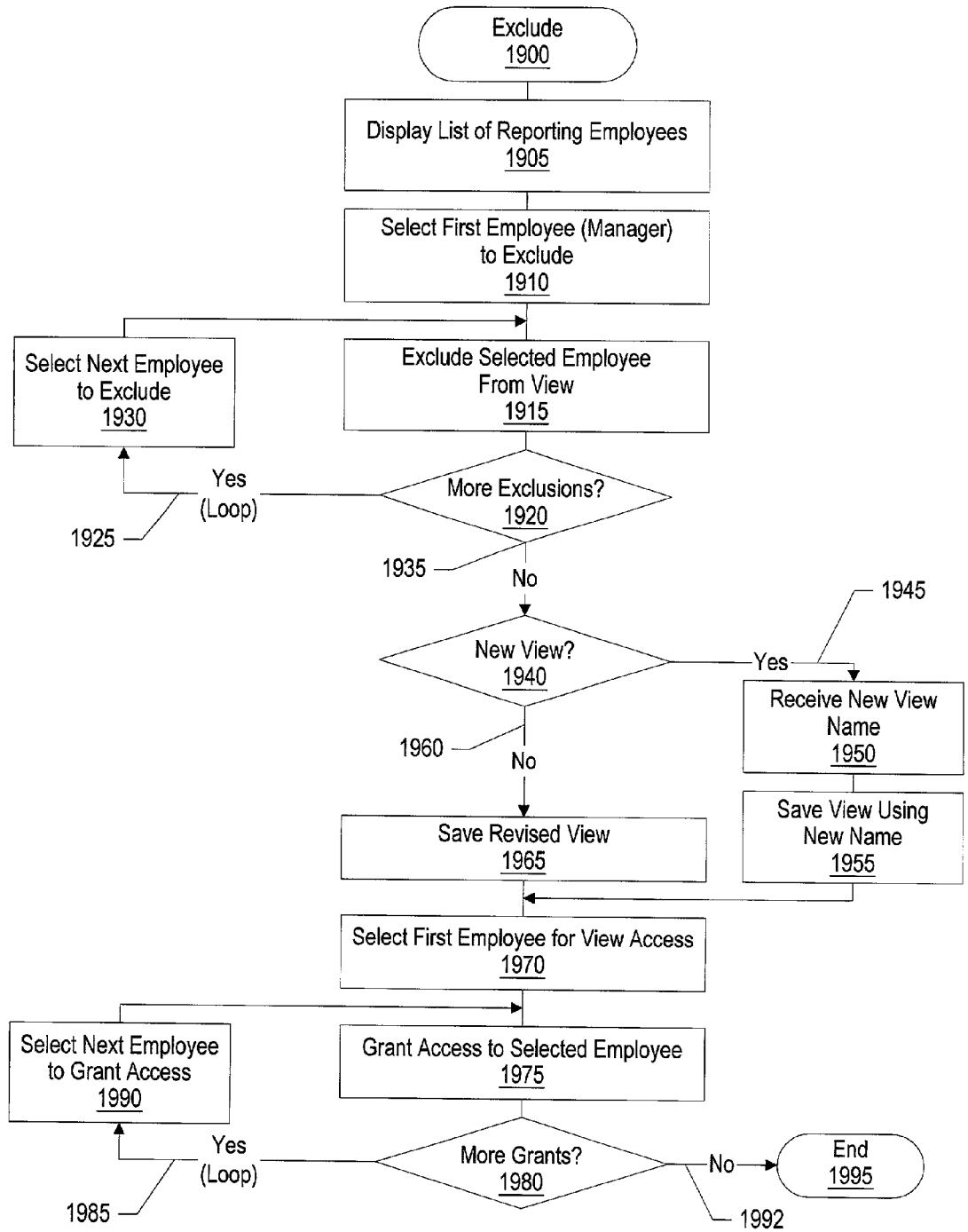
FIG. 19 is a flowchart showing employees being selected and removed from a particular People Planner System view.

FIG. 19 is a flowchart showing employees being selected and removed from a particular People Planner System view. Processing commences at 1900 whereupon a list of all reporting employees is displayed on the manager's display device (step 1905). The project (or higher level) manager selects the first employee (such as a reporting manager) to excluded from a new view (step 1910). The People Planner Data associated with the selected employee is excluded from the new view (step 1915). A determination is made as to whether the manager wants to exclude more employees (such as the department managers) from the new view (decision 1920). If the manager wishes to exclude more employees, decision 1920 branches to "yes" branch 1925 whereupon the next employee (i.e., the next department manager) is selected (step 1930) and processing loops back to excluded the selected employee from the new view. This looping continues until there are no more exclusion to process, at which time decision 1920 branches to "no" branch 1935.

A determination is made as to whether the manager wishes to save the new view or revise the manager's current view (decision 1940). If the manager wishes to create a new view, decision 1940 branches to "yes" branch 1945 whereupon the manager provides a new view name to identify the view (step 1950) and the new view is saved using the new view name (step 1955). On the other hand, if the manager simply wants to revise her current view, decision 1940 branches to "no" branch 1960 whereupon the revised view is saved (step 1965).

The employees granted access to the view will often be the employees whose People Planner Data has been excluded from the view. The excluded employees can automatically be granted access to the new view or the project manager can select employees individually.

The manager selects a first employee (i.e., a department manager) to grant access to the new or revised view (step 1970). The selected employee is granted access to the new or revised view (step 1975). A determination is made as to whether additional grants need to be given for the new or revised view (decision 1980). If more grants need to be given, decision 1980 branches to "yes" branch 1985 whereupon the next employee is selected for granting access to the new or revised view (step 1990) and processing loops back to grant the selected employee access to the view. This looping continues until there are no more employees that need access to the view, at which time decision 1980 branches to "no" branch 1992 and processing ends at 1995.

Figure 20:
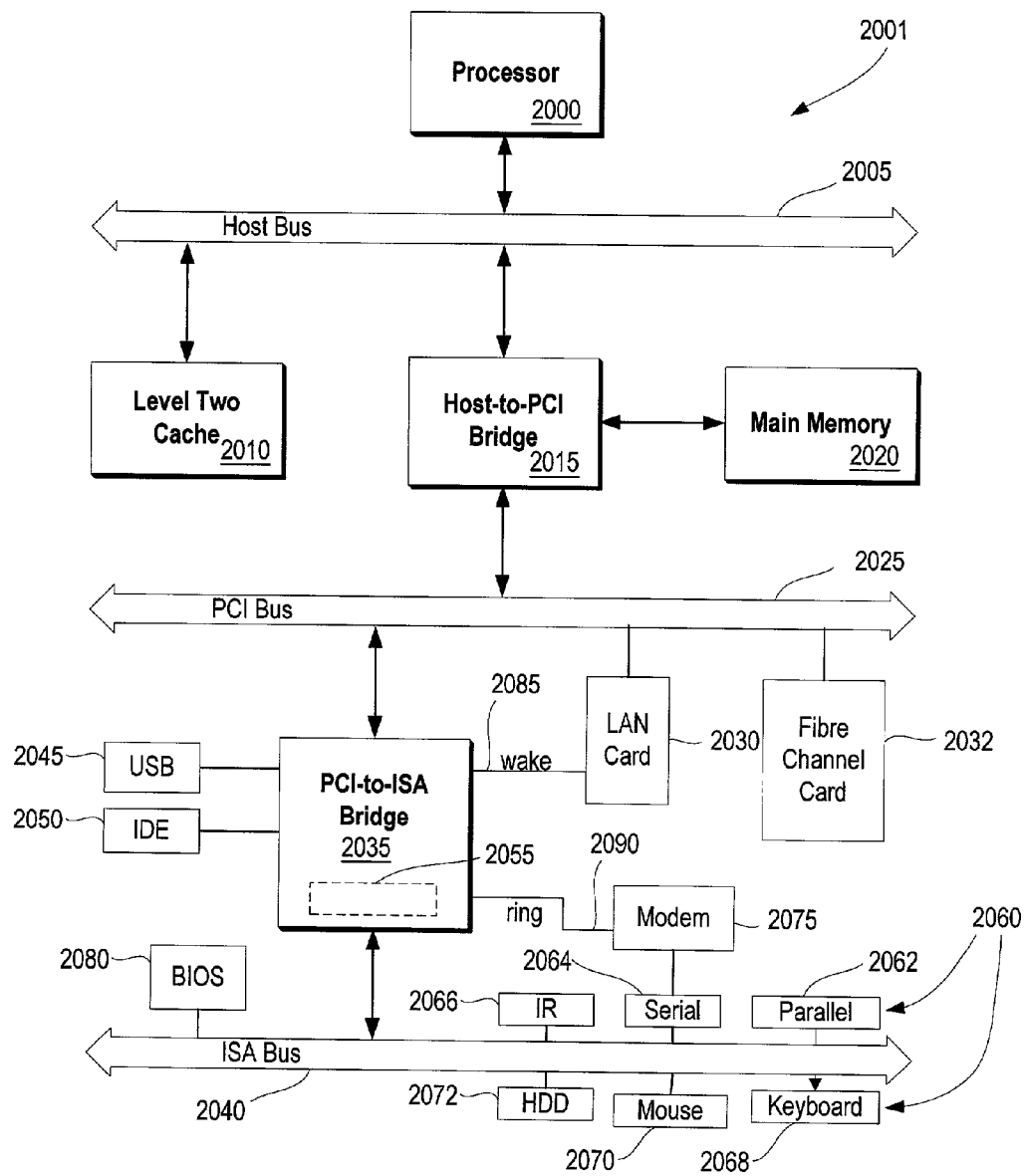
FIG. 20 is a block diagram of an information handling system capable of implementing the present invention.

FIG. 20 illustrates information handling system 2001 which is a simplified example of a computer system capable of performing the present invention. Computer system 2001 includes processor 2000 which is coupled to host bus 2005. A level two (L2) cache memory 2010 is also coupled to the host bus 2005. Host-to-PCI bridge 2015 is coupled to main memory 2020, includes cache memory and main memory control functions, and provides bus control to handle transfers among PCI bus 2025, processor 2000, L2 cache 2010, main memory 2020, and host bus 2005. PCI bus 2025 provides an interface for a variety of devices including, for example, LAN card 2030. PCI-to-ISA bridge 2035 provides bus control to handle transfers between PCI bus 2025 and ISA bus 2040, universal serial bus (USB) functionality 2045, IDE device functionality 2050, power management functionality 2055, and can include other functional elements not shown, such as a real-time clock (RTC), DMA control, interrupt support, and system management bus support. Peripheral devices and input/output (I/O) devices can be attached to various interfaces 2060 (e.g., parallel interface 2062, serial interface 2064, infrared (IR) interface 2066, keyboard interface 2068, mouse interface 2070, and fixed disk (FDD) 2072) coupled to ISA bus 2040. Alternatively, many I/O devices can be accommodated by a super I/O controller (not shown) attached to ISA bus 2040.

BIOS 2080 is coupled to ISA bus 2040, and incorporates the necessary processor executable code for a variety of low-level system functions and system boot functions. BIOS 2080 can be stored in any computer readable medium, including magnetic storage media, optical storage media, flash memory, random access memory, read only memory, and communications media conveying signals encoding the instructions (e.g., signals from a network). In order to attach computer system 2001 another computer system to copy files over a network, LAN card 2030 is coupled to PCI-to-ISA bridge 2035. Similarly, to connect computer system 2001 to an ISP to connect to the Internet using a telephone line connection, modem 2075 is connected to serial port 2064 and PCI-to-ISA Bridge 2035.

While the computer system described in FIG. 20 is capable of executing the invention described herein, this computer system is simply one example of a computer system. Those skilled in the art will appreciate that many other computer system designs are capable of performing the copying process described herein.

One of the preferred implementations of the invention is an application, namely, a set of instructions (program code) in a code module which may, for example, be resident in the random access memory of the computer. Until required by the computer, the set of instructions may be stored in another computer memory, for example, in a hard disk drive, or in a removable memory such as an optical disk (for eventual use in a CD ROM) or floppy disk (for eventual use in a floppy disk drive), or downloaded via the Internet or other computer network. Thus, the present invention may be implemented as a computer program product for use in a computer. In addition, although the various methods described are conveniently implemented in a general purpose computer selectively activated or reconfigured by software, one of ordinary skill in the art would also recognize that such methods may be carried out in hardware, in firmware, or in more specialized apparatus constructed to perform the required method steps.

While particular embodiments of the present invention have been shown and described, it will be obvious to those skilled in the art that, based upon the teachings herein, changes and modifications may be made without departing from this invention and its broader aspects and, therefore, the appended claims are to encompass within their scope all such changes and modifications as are within the true spirit and scope of this invention. Furthermore, it is to be understood that the invention is solely defined by the appended claims. It will be understood by those with skill in the art that is a specific number of an introduced claim element is intended, such intent will be explicitly recited in the claim, and in the absence of such recitation no such limitation is present. For non-limiting example, as an aid to understanding, the following appended claims contain usage of the introductory phrases "at least one" and "one or more" to introduce claim elements. However, the use of such phrases should not be construed to imply that the introduction of a claim element by the indefinite articles "a" or "an" limits any particular claim containing such introduced claim element to inventions containing only one such element, even when the same claim includes the introductory phrases "one or more" or "at least one" and indefinite articles such as "a" or "an"; the same holds true for the use in the claims of definite articles.

What is claimed is:

1. A method for selectively displaying employee profiles, said method comprising:
    displaying, to a user, a first view that includes a plurality of employees and employee profile information corresponding to the plurality of employees;
    selecting one or more employees to exclude from the first view;
    excluding the employee profile information corresponding to the selected employees from the first view, the exclusion resulting in a second view;
    granting view access to the second view to one or more of the selected employees; and
    simultaneously displaying employee profile information pertaining to the second view to a plurality of display devices, wherein at least one of the display devices corresponds to one of the selected employees.

2. The method as described in claim 1 further comprising:
    receiving an employee profile change request to revise the employee profile data corresponding to one of the employees, the received request being from one of the collaborating employees;

modifying the employee profile data according to the request; and displaying the modified employee profile data to the plurality of collaborating employees.

3. The method as described in claim 1 wherein the first view corresponds to a manager and wherein each of the excluded employee profiles corresponds to an employee that reports to the manager.

4. The method as described in claim 1 further comprising:

storing second view data corresponding to the second view on a nonvolatile storage area, the second view data including a grant list of employees that were granted access to the second view and an exclusion list of employee profiles that were excluded from the second view.

5. The method as described in claim 4 further comprising:

receiving a view request from a requesting employee;

retrieving the second view data;

comparing the requesting employee with the grant list of employees; and determining whether to allow the requesting employee access to the second view in response to the comparison.

6. An information handling system comprising:

one or more processors;

a memory accessible by the processors;

one or more nonvolatile storage devices accessible by the processors; and a display tool to selectively display employee employment data, the display tool including:

means for displaying, to a user, a first view that includes a plurality of employees and employee profile information corresponding to the plurality of employees;

means for selecting one or more employees to exclude from the first view;

means for excluding the employee profile information corresponding to the selected employees from the first view, the exclusion resulting in a second view;

means for granting view access to the second view to one or more of the selected employees; and means for simultaneously displaying employee profile information pertaining to the second view to a plurality of display devices, wherein at least one of the display devices corresponds to one of the selected employees.

7. The information handling system as described in claim 6 further comprising:

means for receiving an employee profile change request to revise the employee profile data corresponding to one of the employees, the received request being from one of the collaborating employees;

means for modifying the employee profile data according to the request; and means for displaying the modified employee profile data to the plurality of collaborating employees.

8. The information handling system as described in claim 6 further comprising:

means for storing second view data corresponding to the second view on a nonvolatile storage area, the second view data including a grant list of employees that were granted access to the second view and an exclusion list of employee profiles that were excluded from the second view.

9. The information handling system as described in claim 8 further comprising:

means for receiving a view request from a requesting employee;

means for retrieving the second view data;

means for comparing the requesting employee with the grant list of employees; and means for determining whether to allow the requesting employee access to the second view in response to the comparison.

10. A computer program product stored in a computer operable media for selectively displaying employee data, said computer program product comprising:

means for displaying, to a user, a first view that includes a plurality of employees and employee profile information corresponding to the plurality of employees;

means for selecting one or more employees to exclude from the first view;

means for excluding the employee profile information corresponding to the selected employees from the first view, the exclusion resulting in a second view;

means for granting view access to the second view to one or more of the selected employees; and means for simultaneously displaying employee profile information pertaining to the second view to a plurality of display devices, wherein at least one of the display devices corresponds to one of the selected employees.

11. The computer program product as described in claim 10 further comprising:

means for receiving an employee profile change request to revise the employee profile data corresponding to one of the employees, the received request being from one of the collaborating employees;

means for modifying the employee profile data according to the request; and means for displaying the modified employee profile data to the plurality of collaborating employees.

12. The computer program product as described in claim 10 wherein the first view corresponds to a manager and wherein each of the excluded employee profiles corresponds to an employee that reports to the manager.

13. The computer program product as described in claim 10 further comprising:

means for storing second view data corresponding to the second view on a nonvolatile storage area, the second view data including a grant list of employees that were granted access to the second view and an exclusion list of employee profiles that were excluded from the second view.

14. The computer program product as described in claim 13 further comprising:

means for receiving a view request from a requesting employee;

means for retrieving the second view data;

means for comparing the requesting employee with the grant list of employees; and means for determining whether to allow the requesting employee access to the second view in response to the comparison.

* * * * *